United States Patent
Liu et al.

(10) Patent No.: US 11,239,896 B2
(45) Date of Patent: Feb. 1, 2022

(54) BEAM SWEEPING METHOD FOR MULTIPLE TRANSMITTING BEAMS BASED ON PRIORI INFORMATION

(71) Applicant: Sony Corporation, Tokyo (JP)

(72) Inventors: Wendong Liu, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 70 days.

(21) Appl. No.: 16/636,036

(22) PCT Filed: Sep. 26, 2018

(86) PCT No.: PCT/CN2018/107472
§ 371 (c)(1),
(2) Date: Feb. 3, 2020

(87) PCT Pub. No.: WO2019/062736
PCT Pub. Date: Apr. 4, 2019

(65) Prior Publication Data
US 2021/0152228 A1    May 20, 2021

(30) Foreign Application Priority Data
Sep. 29, 2017 (CN) .......................... 201710902184.4

(51) Int. Cl.
*H04B 7/06* (2006.01)
*H04B 7/0408* (2017.01)
(Continued)

(52) U.S. Cl.
CPC ......... *H04B 7/0695* (2013.01); *H04B 7/0408* (2013.01); *H04B 7/0617* (2013.01);
(Continued)

(58) Field of Classification Search
CPC .. H04B 7/0695; H04B 7/0408; H04B 7/0617; H04B 7/0626; H04B 7/08; H04B 7/088;
(Continued)

(56) References Cited

U.S. PATENT DOCUMENTS

| 8,670,717 B2 | 3/2014 | van Rensburg et al. |
| 2012/0057575 A1 | 3/2012 | Taghavi et al. |

(Continued)

FOREIGN PATENT DOCUMENTS

| CN | 101808341 A | 8/2010 |
| CN | 106797627 A | 5/2017 |

(Continued)

OTHER PUBLICATIONS

Partial Supplementary European Search Report dated Oct. 6, 2020 in European Patent Application No. 18863629.4, 13 pages.

(Continued)

*Primary Examiner* — Ian N Moore
*Assistant Examiner* — Sun Jong Kim
(74) *Attorney, Agent, or Firm* — Xsensus LLP

(57) ABSTRACT

An electronic device and a communication method can provide multiple transmitting beams based on priori information. An electronic device for a first communication device side including: processing circuitry configured to: determine, based on priori information, a transmitting order for a plurality of transmitting beams of the first communication device in beam sweeping to be performed on a communication from the first communication device to a second communication device; and control to use the plurality of transmitting beams in the beam sweeping according to the determined transmitting order.

17 Claims, 12 Drawing Sheets

(51) Int. Cl.
*H04L 5/00* (2006.01)
*H04W 24/08* (2009.01)
*H04W 72/04* (2009.01)
*H04W 72/08* (2009.01)
*G01S 19/42* (2010.01)

(52) U.S. Cl.
CPC ......... *H04B 7/0626* (2013.01); *H04L 5/0048* (2013.01); *H04W 24/08* (2013.01); *H04W 72/0413* (2013.01); *H04W 72/085* (2013.01); *G01S 19/42* (2013.01); *H04W 72/044* (2013.01)

(58) Field of Classification Search
CPC .... H04L 5/0048; H04L 5/0023; H04W 24/08; H04W 72/0413; H04W 72/085; H04W 72/044; H04W 72/04; H04W 72/08; H04W 72/046; H04W 56/001; G01S 19/42

See application file for complete search history.

(56) References Cited

U.S. PATENT DOCUMENTS

| | | | |
|---|---|---|---|
| 2013/0121185 A1* | 5/2013 | Li | H04W 24/10 370/252 |
| 2013/0182683 A1 | 7/2013 | Seol et al. | |
| 2017/0171887 A1* | 6/2017 | Shi | H04W 16/14 |
| 2017/0195893 A1 | 7/2017 | Lee | |
| 2017/0346545 A1* | 11/2017 | Islam | H04B 7/0814 |
| 2018/0332659 A1* | 11/2018 | Hwang | H04W 74/0833 |
| 2018/0367203 A1* | 12/2018 | Nilsson | H04B 7/0617 |
| 2019/0222384 A1* | 7/2019 | Wu | H04W 72/046 |
| 2019/0229821 A1* | 7/2019 | Liu | H04B 7/0658 |
| 2019/0296818 A1* | 9/2019 | Rune | H04B 7/0695 |

FOREIGN PATENT DOCUMENTS

| | | | |
|---|---|---|---|
| CN | 107041012 A | 8/2017 | |
| CN | 107086887 A | 8/2017 | |
| CN | 107210796 A | 9/2017 | |
| WO | 2016/172652 A1 | 10/2016 | |
| WO | WO-2016172652 A1 * | 10/2016 | ........... H04B 7/0695 |

OTHER PUBLICATIONS

International Search Report and Written Opinion dated Dec. 20, 2018 for PCT/CN2018/107472 filed on Sep. 26, 2018, 8 pages including English Translation of the International Search Report.

* cited by examiner

BEAM SWEEPING METHOD FOR MULTIPLE TRANSMITTING BEAMS BASED ON PRIORI INFORMATION

CROSS REFERENCE TO RELATED APPLICATIONS

The present application is based on PCT filing PCT/CN2018/107472, filed Sep. 26, 2018, which claims the benefit of priority to the Chinese patent application No. 201710902184.4, filed Sep. 29, 2017, the present disclosure of each is incorporated herein by reference in its entirety as a part of the present application.

TECHNICAL FIELD

The present disclosure relates to an electronic device and a communication method, and more particularly, to an electronic device and a communication method for beam sweeping in a wireless communication system.

BACKGROUND

In a wireless communication system using a Multiple-Input Multiple-Output (MIMO) technique, a base station (as an example of a network-side communication device or communication node in the system) and a terminal device (also referred to as a User Equipment (UE), as an example of a user-side communication device or communication node in the system) have a plurality of antennas supporting the MIMO technique. Antennas for the base station and the antennas for the UE may form spatial beams with a narrower directivity, to provide strong power coverage in a particular direction, to thereby combat a large path loss present in high frequency band (e.g., millimeter wave) channels. However, since these spatial beams have strong directivity and narrow coverage, it is necessary to select appropriate transmitting and receiving beams from among a plurality of transmitting and receiving beams of the base station and the UE for transmission of data and/or control signals on the uplink and downlink channels.

The appropriate transmitting and receiving beams may be selected by means of beam sweeping. Specifically, by performing downlink beam sweeping from the base station to the UE, downlink reference signals are transmitted on a plurality of transmitting beams of the base station, and the downlink reference signals are received by a plurality of receiving beams of the UE, and the strongest transmitting beam of the base station and the strongest receiving beam of the UE may be selected for transmission of data and/or control signals on a downlink channel. Likewise, by performing uplink beam sweeping from the UE to the base station, the strongest receiving beam of the base station and the strongest transmitting beam of the UE may be selected for transmission of data and/or control signals on an uplink channel.

SUMMARY

A brief summary of the present disclosure is given below in order to provide a basic understanding of some aspects of the present disclosure. However, it should be understood that this summary is not an exhaustive summary of the present disclosure. It is not intended to identify key or critical elements of the present disclosure or to restrict the scope of the present disclosure. Its sole purpose is to present some concepts of the present disclosure in a simplified form as a prelude to a more detailed description that is presented later.

According to an aspect of the present disclosure, there is provided an electronic device for a first communication device side. The electronic device may include processing circuitry, the processing circuitry may be configured to: determine, based on priori information, a transmitting order for a plurality of transmitting beams of the first communication device in beam sweeping to be performed on a communication from the first communication device to a second communication device. The processing circuitry may be further configured to control to use the plurality of transmitting beams in the beam sweeping according to the determined transmitting order.

According to another aspect of the present disclosure, there is provided an electronic device for a second communication device side. The electronic device may include processing circuitry, the processing circuitry may be configured to: measure a reference signal transmitted by a first communication device. The processing circuitry may be further configured to feedback to the first communication device, in the case that a reception quality for the measured reference signal is above a predetermined threshold for the first time, information indicating a transmitting beam of the first communication device corresponding to the reference signal for which the reception quality is above the predetermined threshold.

According to another aspect of the present disclosure, a communication method is provided. The method may include: determining, by a first communication device, based on priori information, a transmitting order for a plurality of transmitting beams of the first communication device in beam sweeping to be performed on a communication from the first communication device to a second communication device. The communication method may further include: controlling, by the first communication device, to use the plurality of transmitting beams in the beam sweeping according to the determined transmitting order.

According to another aspect of the present disclosure, a communication method is provided. The method may include: measuring, by a second communication device, a reference signal transmitted by the first communication device. The communication method may further include: feeding back by the second communication device to the first communication device, in the case that a reception quality for the measured reference signal is above a predetermined threshold for the first time, information indicating a transmitting beam of the first communication device corresponding to the reference signal for which the reception quality is above the predetermined threshold.

According to another aspect of the present disclosure, there is provided a computer-readable storage medium including executable instructions that, when executed by an information processing device, cause the information processing device to perform the communication method according to the present disclosure.

In accordance with one or more embodiments of the present disclosure, appropriate transmitting and receiving beams can be determined more quickly in beam sweeping for transmission of data and/or control signals on uplink and downlink channels.

DRAWINGS

The accompanying drawings, which constitute a part of this specification, illustrate embodiments of the present disclosure and together with the description, serve to explain the principles of the present disclosure.

The present disclosure will be more clearly understood from the following detailed description with reference to the accompanying drawings, in which.

DETAILED DESCRIPTION

Figure 1:
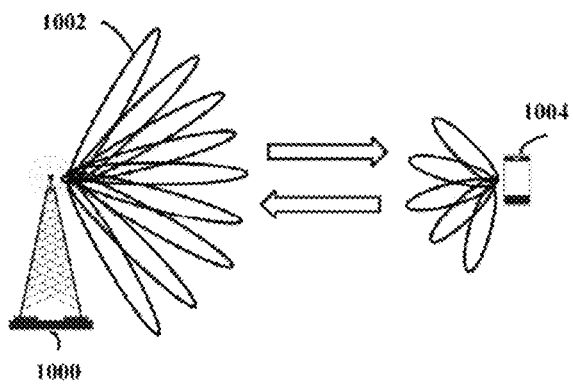
FIG. 1 is a schematic diagram illustrating a beam sweeping process in a wireless communication system.

Various exemplary embodiments of the present disclosure will now be described in detail with reference to the accompanying drawings. It should be noted that: relative arrangements of components and steps, numerical expressions, and numerical values set forth in these embodiments do not limit the scope of the present disclosure unless specifically stated otherwise.

Meanwhile, it should be understood that, the sizes of the respective portions shown in the drawings are not drawn in an actual proportional relationship for the convenience of description.

The following description of at least one exemplary embodiment is merely illustrative and is in no way intended to limit the present disclosure, its application, or uses.

Techniques, methods, and apparatuses known to those of ordinary skill in the relevant art may not be discussed in detail but are intended to be part of the specification where appropriate.

In all examples shown and discussed herein, any particular value should be construed as merely illustrative, and not limiting. Thus, other examples of the exemplary embodiments may have different values.

It should be noted that: like reference numbers and letters refer to like items in the following figures, and thus, once an item is defined in one figure, further discussion thereof is not required in subsequent figures.

To facilitate a better understanding of the technical solutions according to the present disclosure, some wireless communication technologies applicable to the embodiments of the present disclosure are briefly described below.

The base station and the UE have multiple antennas supporting MIMO technology. The use of MIMO technology enables the base station and the UE to exploit the spatial domain to support spatial multiplexing, beamforming, and transmit diversity. Spatial multiplexing may be used to transmit different data streams simultaneously on the same frequency. These data streams may be transmitted to a single UE to increase the data rate (which may be classified as SU-MIMO technology) or to multiple UEs to increase the overall system capacity (which may be classified as MU-MIMO technology). This is achieved by spatially precoding each data stream (i.e., applying amplitude scaling and phase adjustment at the baseband) and then transmitting each spatially precoded stream over multiple transmit antennas on the Downlink (DL) from the base station to the UE. The spatially precoded data streams arrives at the UE(s) with different spatial signatures, which enables each of the UE(s) to receive the data streams via its multiple antennas and recover one or more data streams destined for the UE. On the Uplink (UL) from the UE to the base station, each UE transmits the spatially precoded data streams through its multiple antennas, which enables the base station to receive the data streams through its antennas and identify a source of each spatially precoded data stream.

In addition to spatial precoding at the baseband, phases of multiple antennas connected to each radio frequency link can be adjusted to focus the transmit/receive energy of a respective radio frequency link in a particular direction using beamforming, to thereby improve signal transmit/ receive strength. The beams mentioned in the following embodiments of the present disclosure are formed mainly in this way.

Next, a radio protocol architecture for use in a user plane and a control plane in LTE (Long Term Evolution), NR (New Radio) is explained. The radio protocol architecture for use in the UE and the eNB, gNB is shown with three layers: Layer 1, Layer 2 and Layer 3. Layer 1 (L1 layer) is the lowest layer and implements various signal processing functions in physical layer. The L1 layer will be referred to herein as a physical layer. Layer 2 (L2 layer) is above the physical layer and is responsible for a link above the physical layer between the UE and the eNB, gNB.

In the user plane, the L2 layer includes a Medium Access Control (MAC) sublayer, a Radio Link Control (RLC) sublayer, and a Packet Data Convergence Protocol (PDCP) sublayer, which are terminated at the eNB, gNB on the network side. The UE may also have several upper layers above the L2 layer, including a network layer (e.g., IP layer) that terminates at a PDN gateway on the network side, and an application layer that terminates at the other end of the connection (e.g., far end UE, server, etc.).

The PDCP sublayer provides multiplexing between different radio bearers and logical channels. The PDCP sublayer also provides header compression for upper layer data packets to reduce radio transmission overhead, provides security by ciphering the data packets, and provides handover support for UEs between respective eNBs, gNBs. The RLC sublayer provides segmentation and reassembly of upper layer data packets, retransmission of lost data packets, and reordering of data packets to compensate for out-of-order reception due to hybrid automatic repeat request (HARQ). The MAC sublayer provides multiplexing between logical channels and transmission channels. The MAC sublayer is also responsible for allocating various radio resources (e.g., resource blocks) in one cell among the UEs. The MAC sublayer is also responsible for HARQ operations.

In the control plane, the radio protocol architecture for use in the UE and eNB, gNB is substantially the same for the physical layer and the L2 layer, except that there is no header compression function in the control plane. The control plane further includes a Radio Resource Control (RRC) sublayer in Layer 3 (layer L3). The RRC sublayer is responsible for obtaining radio resources (i.e., radio bearers) and configuring the lower layers using RRC signaling between the eNB, the gNB, and the UE.

Various signal processing functions of the L1 layer (i.e., physical layer) implemented by the base station side are briefly described. These signal processing functions include coding and interleaving to facilitate Forward Error Correction (FEC) for the UE and mapping to signal constellations based on various modulation schemes (e.g., Binary Phase Shift Keying (BPSK), Quadrature Phase Shift Keying (QPSK), M-phase shift keying (M-PSK), M-quadrature amplitude modulation (M-QAM)). The coded and modulated symbols are then split into parallel streams. Each stream is then used, along with a reference signal, to generate a physical channel that carries a stream of time-domain symbols. The symbol stream is spatially precoded to produce a plurality of spatial streams Channel estimate may be used to determine a coding and modulation scheme and for spatial processing. The channel estimate may be derived from a reference signal and/or channel condition feedback transmitted by the UE. Each spatial stream is then provided to a different antenna via a separate transmitter. Each transmitter modulates an RF carrier with a respective spatial stream for transmission.

At the UE, each receiver receives a signal through its respective antenna. Each receiver recovers information modulated onto a Radio Frequency (RF) carrier and provides the information to various signal processing functions of the L1 layer. Spatial processing is performed on this information at the L1 layer to recover any spatial stream destined for the UE. If multiple spatial streams are destined for the UE, they may be combined into a single symbol stream. The symbol stream is then converted from the time domain to the frequency domain. Each symbol, as well as the reference signal, is recovered and demodulated by determining signal constellation points most likely to be transmitted by the eNB, the gNB. These soft decisions may be based on channel estimates. These soft decisions are then decoded and deinterleaved to recover the data and control signals that were originally transmitted by the eNB, the gNB on the physical channel. These data and control signals are then provided to higher layers to be processed.

The beam sweeping process in a wireless communication system is described below in connection with FIG. 1. An arrow to the right in FIG. 1 represents a downlink direction from base station 1000 to terminal device 1004, and an arrow to the left represents an uplink direction from terminal device 1004 to base station 1000. As shown in FIG. 1, the base station 1000 includes downlink transmitting beams with a number of $n_{t\_DL}$ ($n_{t\_DL}$ is a natural number equal to or greater than 1, illustrated as $n_{t\_DL}=9$ in FIG. 1), and the terminal device 1004 includes downlink receiving beams with a number of $n_{r\_DL}$ ($n_{r\_DL}$ is a natural number equal to or greater than 1, illustrated as $n_{r\_DL}=5$ in FIG. 1). Further, in the wireless communication system shown in FIG. 1, according to an example, the number $n_{r\_UL}$ of the uplink receiving beams of the base station 1000 and the coverage of each beam are the same as those of the downlink transmitting beams, and the number $n_{t\_UL}$ of the uplink transmitting beams of the terminal device 1004 and the coverage of each beam are the same as those of the downlink receiving beams. However, it should be understood that the coverage and the number of the uplink receiving beams and the downlink transmitting beams of the base station may be different according to system requirements and settings, and the same is true for the terminal device.

As shown in FIG. 1, in the downlink beam sweeping process, one (e.g., beam 1002) of the $n_{t\_DL}$ downlink transmitting beams of the base station 1000 transmits $n_{r\_DL}$ downlink reference signals to the terminal device 1004, and the terminal device 1004 receives the $n_{r\_DL}$ downlink reference signals through the $n_{r\_DL}$ downlink receiving beams respectively. The terminal device 1004 measures the $n_{r\_DL}$ downlink reference signals (e.g., measures the received signal power of the downlink reference signals (e.g., reference signal received power RSRP), channel quality (e.g., channel quality indicator CQI)), thereby determining the strongest downlink receiving beam of the terminal device 1004. Next, $n_{t\_DL}-1$ downlink transmitting beams for example except the beam 1002, among the $n_{t\_DL}$ downlink transmitting beams of the base station 1000, respectively transmit $n_{r\_DL}-1$ downlink reference signals to the terminal device 1004, and the terminal device 1004 respectively receives and measures the $n_{t\_DL}-1$ downlink reference signals by using the determined strongest downlink receiving beam, thereby determining the strongest transmitting beam of the base station 1000.

The uplink beam sweeping process is similar to the downlink beam sweeping process, and the $n_{t\_UL}$ uplink transmitting beams of the terminal device 1004 and the $n_{r\_UL}$ uplink receiving beams of the base station 1000 are used to perform the uplink beam sweeping, so as to determine the strongest uplink transmitting beam of the terminal device 1004 and the strongest uplink receiving beam of the base station 1000.

It should be understood that the coverage and number of the uplink receiving beams and the downlink transmitting beams of the base station may be different, and the coverage and number of the uplink transmitting beams and the downlink receiving beams of the terminal device may also be different, and the above determining operation may also be performed similarly.

After the downlink beam sweeping and the uplink beam sweeping are completed, the determined strongest transmitting and receiving beams of the base station and the terminal device are used for the subsequent transmission of data and/or control signals.

The above process of determining the strongest transmitting and receiving beams of the base station and the terminal device through beam sweeping is also referred to as a beam training process. The number of beam sweeps performed during the beam training process may be represented by a beam training overhead. In the beam training process shown in FIG. 1, the downlink beam training overhead is $n_{t\_DL}+n_{r\_DL}$, and the uplink beam training overhead is $n_{t\_UL}+n_{r\_UL}$.

In addition, unlike the beam training process shown in FIG. 1, in some beam training processes, in order to determine the strongest transmitting and receiving beam pair of the base station 1000 and the terminal device 1004, it is necessary to traverse all transmitting and receiving beam pairs of the base station 1000 and the terminal device 1004; in this case, the downlink beam training overhead is $n_{t\_DL} \times n_{r\_DL}$, and the uplink beam training overhead is $n_{t\_UL} \times n_{r\_UL}$.

The receiving beams and transmitting beams of the base station and the terminal device may be generated by DFT (Discrete Fourier Transform) vectors. In the following, the downlink transmitting beam at the base station side is taken as an example for description, and the uplink receiving beam at the base station side and the transmitting/receiving beam at the terminal device side may be generated also by a similar method.

For example, the DFT vector urn at the base station side may indicate one downlink transmitting beam of the base station, which is represented as:

$$u_m = \begin{bmatrix} 1 & e^{j\frac{2\pi m}{O_2 n_t}} & \ldots & e^{j\frac{2\pi m(n_t-1)}{O_2 n_t}} \end{bmatrix} \quad \text{[Equation 1]}$$

where $n_t$ denotes the number of transmit antennas provided at the base station side, $O_2$ denotes an oversampling parameter, and $m=0, 1, \ldots, O_2 n_t - 1$.

Generally, the larger the number $n_t$ of the antennas or the product of $O_2$ and $n_t$, the stronger the spatial directivity of the obtained beam and the stronger the beamforming capability, but the narrower the beam width in general. In some embodiments, $O_2=1$ and $n_t=1$ may be taken, and the resulting DFT vector $u_m$ is a vector in which $n_t$ elements are all 1.

In the above-described beam training process, it needs to traverse all uplink transmitting and receiving beams and downlink transmitting and receiving beams of the base station and the terminal device to select the most suitable transmitting and receiving beams. Such a beam training process requires a large amount of system resources to be consumed and has a high system delay.

The present disclosure proposes a beam training scheme based on priori information, wherein the priori information is utilized to determine the transmitting order and receiving order of the transmitting beams and receiving beams on which beam sweeping is to be performed, to enable faster determination of appropriate transmitting and receiving beams in the beam sweeping. The beam training scheme based on the priori information according to the present disclosure is described below with reference to FIGS. 2-14.

Figure 2:
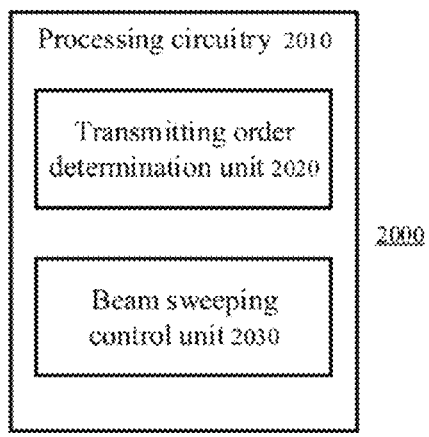
FIG. 2 is a block diagram illustrating an exemplary configuration of an electronic device for a first communication device side according to an embodiment of the present disclosure.

FIG. 2 is a block diagram illustrating an exemplary configuration of an electronic device 2000 for a first communication device side according to an embodiment of the present disclosure.

In some embodiments, the electronic device 2000 may include processing circuitry 2010. The processing circuitry 2010 of the electronic device 2000 provides various functions of the electronic device 2000. In some embodiments, the processing circuitry 2010 of the electronic device 2000 may be configured to perform the communication method of the electronic device 2000 for the first communication device side.

The processing circuit 2010 may refer to various implementations of digital circuitry, analog circuitry, or mixed-signal (a combination of analog and digital) circuitry that performs functions in a computing system. The processing circuitry may include, for example, circuitry such as an Integrated Circuit (IC), an Application Specific Integrated Circuit (ASIC), portions or circuits of an individual processor core, an entire processor core, an individual processor, a programmable hardware device such as a Field Programmable Gate Array (FPGA), and/or a system including multiple processors.

In some embodiments, the processing circuit 2010 may include a transmitting order determination unit 2020 and a beam sweeping control unit 2030, configured to perform step S3000 and step S3010, respectively, in the communication method of the electronic device 2000 for the first communication device side illustrated in FIG. 3 described later.

In some embodiments, the electronic device 2000 may also include a memory (not shown). The memory of the electronic device 2000 may store information generated by the processing circuitry 2010 and programs and data for operation of the electronic device 2010. The memory may be a volatile memory and/or a non-volatile memory. For example, the memory may include, but is not limited to, Random Access Memory (RAM), Dynamic Random Access Memory (DRAM), Static Random Access Memory (SRAM), Read Only Memory (ROM), and flash memory.

In addition, the electronic device 2000 may be implemented at a chip level, or may also be implemented at a device level by including other external components. In some embodiments, the electronic device 2000 may be implemented as a first communication device as a whole, and may further include a plurality of antennas.

It should be understood that the above units are only logic modules divided according to specific functions realized by the units, and are not used for limiting specific implementations. In an actual implementation, the above units may be implemented as separate physical entities, or may also be implemented by a single entity (e.g., a processor (CPU or DSP, etc.), an integrated circuit, etc.).

Figure 3:
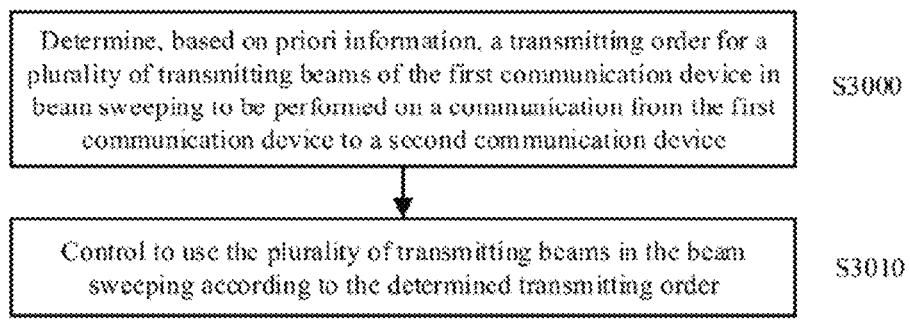
FIG. 3 is an exemplary flowchart illustrating a communication method for a first communication device side according to an embodiment of the present disclosure.

FIG. 3 is an exemplary flowchart illustrating a communication method for a first communication device side according to an embodiment of the present disclosure. The communication method implements beam training based on priori information, and may be used in for example an electronic device 2000 as shown in FIG. 2.

As shown in FIG. 3, in step S3000, the first communication device determines, based on priori information, a transmitting order for a plurality of transmitting beams of the first communication device in beam sweeping to be performed on a communication from the first communication device to a second communication device. In step S3010, the first communication device controls to use the plurality of transmitting beams in the beam sweeping according to the determined transmitting order.

In some embodiments, the first communication device is a base station, the second communication device is a terminal device, and the communication from the first communication device to the second communication device is downlink communication. In further embodiments, the first communication device is a terminal device, the second communication device is a base station, and the communication from the first communication device to the second communication device is uplink communication.

In some embodiments, the priori information may include a number of times that the plurality of transmitting beams of the first communication device were used in the data transmission. In some embodiments, the priori information may include geographical position information of the second communication device.

The priori information may be directly obtained by the first communication device by means of pre-recording, pre-measuring, etc. The priori information may also be obtained by the first communication device based on feedback from the second communication device. The priori information may also be obtained by the first communication device from other devices than the second communication device. In addition, the priori information may be recorded simultaneously on the first communication device side and the second communication device side.

In the beam training scheme based on priori information of the present disclosure, a transmitting order for a plurality of transmitting beams on which beam sweeping is to be performed is determined based on the priori information and the beam sweeping according to the determined transmitting order is performed, which enables faster determination of appropriate transmitting beams in the beam sweeping, for subsequent transmission of data and/or control signals.

Figure 4:
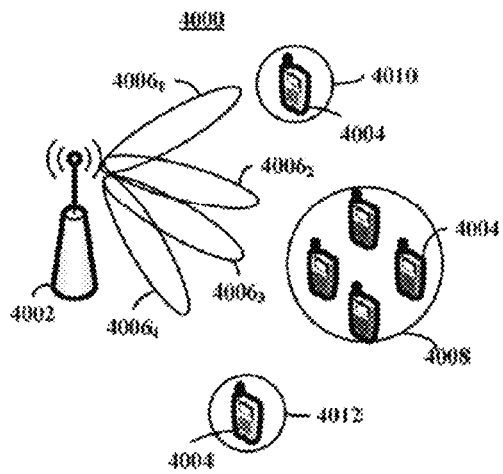
FIG. 4 is a schematic diagram illustrating an example of a wireless communication system to which a beam training scheme according to the present disclosure can be applied.

FIG. 4 is an exemplary schematic diagram illustrating a wireless communication system 4000 to which a beam training scheme according to the present disclosure can be applied. As shown in FIG. 4, the wireless communication system 4000 includes a base station 4002 and a plurality of terminal devices 4004. The base station 4002 has a plurality of transmitting beams 4006$_1$, 4006$_2$, 4006$_3$, and 4006$_4$ with different transmit directions. In addition, the terminal device 4004 may have one or more receiving beams (not shown). The plurality of terminal devices 4004 are located in areas 4008, 4010, and 4012, respectively, wherein a density of terminal devices in the area 4008 is higher than densities of terminal devices in the areas 4010 and 4012. In addition, the base station 4002 may correspond to, for example, the first communication device described with reference to FIG. 3, and the terminal device 4004 may correspond to, for example, the second communication device described with reference to FIG. 3.

The number of times that the plurality of transmitting beams of the base station were used in data transmission may be different during communication in the wireless communication system. Such a difference is more remarkable particularly in a wireless communication system in which the distribution density of terminal devices is not uniform as shown in FIG. 4, and the transmitting beams directed to densely-distributed terminal devices may be used more times. The inventors of the present disclosure have found that such information on the number of times can be recorded in advance as priori information to determine the transmitting order of the transmitting beams in the beam sweeping to be performed, so that the transmitting beams used more times are preferentially used in the beam sweeping, whereby an appropriate transmitting beam can be determined more quickly in the beam sweeping.

In some embodiments, the priori information may include the pre-recorded number of times the plurality of transmitting beams 4006$_1$, 4006$_2$, 4006$_3$, and 4006$_4$ were used in the data transmission, respectively. The base station 4002 determines a transmitting order of the transmitting beams 4006$_1$, 4006$_2$, 4006$_3$, and 4006$_4$ based on the priori information, and performs beam sweeping in accordance with the determined transmitting order. Hereinafter, this priori information is also sometimes referred to as number-of-times recording information of the transmitting beams.

In some embodiments, the transmitting order of the transmitting beams may be determined from the priori number-of-times information of the beams such that the transmitting order of the transmitting beam which was used more times is earlier.

Table 1 illustrates the transmitting order determined according to the number-of-times recording information of the transmitting beams. In this example, the number-of-times recording information of the transmitting beams 4006$_1$, 4006$_2$, 4006$_3$, and 4006$_4$ is 10, 20, 25, and 15, respectively. The base station 4002 arranges the transmitting order of the transmitting beams 4006$_1$, 4006$_2$, 4006$_3$, and 4006$_4$ in a descending order according to the number-of-times recording information, that is, the transmitting order of the transmitting beams 4006$_1$, 4006$_2$, 4006$_3$, and 4006$_4$ is 4, 2, 1, and 3, respectively. Next, the base station 4002 uses the transmitting beams 4006$_3$, 4006$_2$, 4006$_4$, 4006$_1$ in order in the beam sweeping according to the determined transmitting order.

Since the transmitting beam 4006$_3$ is used the most frequently in previous data transmission, it is most likely that the transmitting beam 4006$_3$ is determined to be an appropriate transmitting beam in the beam sweeping to be performed, and thus it is possible to determine an appropriate transmitting beam relatively quickly in the beam sweeping.

TABLE 1

| Transmitting beam | 4006$_1$ | 4006$_2$ | 4006$_3$ | 4006$_4$ |
|---|---|---|---|---|
| Number-of-times recording information | 10 | 20 | 25 | 15 |
| Transmitting order | 4 | 2 | 1 | 3 |

It should be understood that the transmitting order shown in Table 1 is only an example but not a limitation, the transmitting order determined according to the number-of-times recording information of the transmitting beams is not limited to the transmitting order described herein, and those skilled in the art can design a rule for the transmitting order based on the priori information according to actual situations of the communication system under the teaching of the present disclosure.

In some embodiments, the number-of-times recording information of the transmitting beams may comprise the number of times a plurality of transmitting beams are respectively used in data transmissions from a base station to a plurality of different terminal devices in a cell controlled by the base station. The number-of-times recording information may be referred to as cell-specific number-of-times recording information.

For example, the number-of-times recording information of the transmitting beam $4006_i$ (i=1, 2, 3, or 4) shown in Table 1 may be a sum of the number of times the transmitting beam $4006_i$ is used by the plurality of terminal devices 4008. The sum can reflect the distribution of the terminal devices to a certain extent. As shown in FIG. 4, since the density of the terminal devices in an area 4008 (illustrated as four terminal devices) is higher than the density of the terminal devices in areas 4010 and 4012 (illustrated as one terminal device each), the transmitting beams $4006_2$ and $4006_3$ directed to the area 4008 are used a higher number of times in data transmission than the transmitting beams directed to other areas.

In these embodiments, beam training is performed by using the cell-specific number-of-times recording information, so that the transmitting beam directed to an area with a higher user distribution density can be used for beam sweeping first, and the terminal device can determine an appropriate transmitting beam of the base station more quickly, for subsequent data transmission. Such embodiments are particularly applicable to wireless communication environments where the user distribution density is not uniform.

In some embodiments, the number-of-times recording information of the transmitting beams may include the number of times a plurality of transmitting beams are respectively used in the data transmission from the base station to the same one terminal device. The number-of-times recording information may be referred to as UE-specific number-of-times recording information. For example, the number-of-times recording information of the transmitting beam $4006_i$ (i=1, 2, 3, or 4) shown in Table 1 may indicate the number of times the transmitting beam 4006i is used by a single terminal device 4004.

In these embodiments, beam training is performed by using the UE-specific number-of-times recording information, so that the beam sweeping process of each terminal device can be optimized in a targeted manner, and this is particularly suitable for a scenario in which the position of the terminal device is relatively fixed (for example, in the office at work time and at home at night) or a scenario in which the terminal device is an Internet-of-things device such as a smart electric meter with a fixed position in the Internet of things. In such a scenario, the UE-specific number-of-times recording information may also be used to select a range for beam training, for example, if some transmitting beams are never or rarely used by a specific UE, these transmitting beams may be excluded from the beam training for a later period of time, that is, a subset of the transmitting beams may be determined for subsequent training, which may further reduce an overhead of the beam sweeping. More preferably, the number-of-times information of the transmitting beams also includes time-related information, for example, 24 hours a day are divided into several time intervals, and the information as shown in Table 1 is respectively recorded for each time interval, so as to adapt to characteristics of the position of the terminal in each time interval.

In some embodiments, the priori information may be pre-recorded in the base station side. For example, the base station counts and records the transmitting beams actually used in the data transmission. In some other embodiments, the priori information may be pre-recorded in the terminal device side, and the base station acquires the priori information through feedback from the terminal device. In addition, the base station and the terminal device can simultaneously record and maintain the priori information. In some embodiments, the pre-recorded priori information may be updated each time data transmission is made once.

FIG. 4 illustrates a case where the beam training method of the present disclosure is applied to downlink communication of the wireless communication system 4000 in which the first communication device is a base station and the second communication device is a terminal device. It should be understood that the beam training scheme according to the present disclosure is equally applicable in uplink communication of a wireless communication system in which the first communication device is a terminal device and the second communication device is a base station.

In the communication process of the wireless communication system, a geographical position of the terminal device may affect the selection of the transmitting beam of the base station. Especially, in the case of a small number of terminal devices with a relatively dispersed distribution, the geographical position of the terminal device has a great effect on the selection of the transmitting beam. The inventors of the present disclosure have found that such geographical position information can be used as priori information to determine a transmitting order for transmitting beams in beam sweeping to be performed such that transmitting beams more likely to be used for data communication are preferentially used for beam sweeping, thereby more quickly determining an appropriate transmitting beam in the beam sweeping. A beam training scheme based on the geographical position information according to the present disclosure will be described in detail below with reference to FIG. 5.

Figure 5:
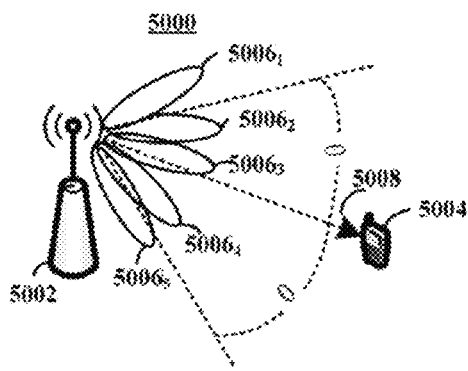
FIG. 5 is a schematic diagram illustrating an example of a wireless communication system to which a beam training scheme according to the present disclosure can be applied.

FIG. 5 is an exemplary schematic diagram illustrating a wireless communication system 5000 to which a beam training scheme according to the present disclosure can be applied. As shown in FIG. 5, the wireless communication system 5000 includes a base station 5002 and a plurality of terminal devices 5004. The base station 5002 has a plurality of transmitting beams $5006_1$, $5006_2$, $5006_3$, $5006_4$ and $5006_5$ whose transmission directions are different. The terminal device 5004 can be located at a certain location and have one or more receiving beams (not shown). In addition, the base station 5002 may correspond to the first communication device described with reference to FIG. 3, for example, and the terminal device 5004 may correspond to the second communication device described with reference to FIG. 3, for example.

In some embodiments, the priori information may include the geographical position information of the terminal device 5004. The base station 5002 determines the transmitting order for the transmitting beams $5006_1$, $5006_2$, $5006_3$, $5006_4$ and $5006_5$ from the geographical position information, and performs beam sweeping in accordance with the determined transmitting order.

In some embodiments, the transmitting order for the transmitting beams may be determined from the geographical position information such that the transmitting order of the transmitting beam pointing in a direction closer to the geographical position indicated by the geographical position information is earlier.

As shown in FIG. 5, a dashed arrow 5008 from the base station 5002 to the terminal device 5004 indicates a direction pointing to the geographical position of the terminal device 5004. In some embodiments, the transmitting beams $5006_3$, $5006_2$, $5006_4$, $5006_1$, $5006_5$ may be used for beam sweeping in order, according to how close the direction in which the transmitting beam is pointed to with respect to the direction in which the arrow 5008 is pointed to, such that the transmitting order of the transmitting beam whose pointing direction is closer to the direction of the dashed arrow 5008 is earlier. In some other embodiments, the transmitting beam whose pointing direction is closest to the pointing direction of the arrow 5008 may be determined first, and then the transmitting beam serves as a middle beam and beams on both sides thereof are sequenced in order, and the beam sweeping is performed according to the transmitting order.

In this example, since the direction in which the transmitting beam $5006_3$ is pointed to is closest to the geographical position of the terminal device, it is most likely that the transmitting beam $5006_3$ is determined as an appropriate transmitting beam in the beam sweeping to be performed, so that an appropriate transmitting beam can be determined more quickly in the beam sweeping.

In some embodiments, the base station 5002 may determine a set of candidate transmitting beams based on the geographical position information of the terminal device 5004, wherein transmitting beams inside the set of candidate transmitting beams are more likely to be determined as appropriate transmitting beams in the beam sweeping, and transmitting beams outside the set of candidate transmitting beams are less likely to be determined as appropriate transmitting beams in the beam sweeping.

For example, as shown in FIG. 5, the transmitting beams $\{5006_2, 5006_3, 5006_4\}$ whose pointing directions are different from the pointing direction of the arrow 5008 within a range of a predetermined threshold θ (within two dotted lines in FIG. 5) may be taken as the set of candidate transmitting beams. For the transmitting beams inside the set of candidate beams, the transmitting order may be determined according to the geographical position of the terminal device as described above. For the transmitting beams outside the set of candidate beams, they may not be used for beam sweeping. In this way, the number of transmitting beams used for beam sweeping can be reduced, thereby reducing beam training overhead. Additionally, the transmitting beams outside the set of candidate beams may also be queued after all transmitting beams inside the set of candidate beams.

In some embodiments, the predetermined threshold θ may be adjusted based on the accuracy of the geographical position of the terminal device. When the accuracy of the geographic position of the terminal device is low, the predetermined threshold θ may be set to be smaller to narrow the range of the set of candidate transmitting beams, thereby reducing the beam training overhead. When the accuracy of the geographical position of the terminal device is low, the predetermined threshold θ may be set to be larger to expand the range of the set of candidate transmitting beams, thereby ensuring that an appropriate transmitting beam can be determined during the beam sweeping process.

In some embodiments, the beam training scheme according to geographical position information of the present disclosure may be applied to a beam training process in a vertical direction. For example, the transmitting order of a transmitting beam pointing more perpendicularly to the ground may be made earlier. Since in an actual wireless communication system, the distribution of users in the vertical direction is more concentrated on the ground, the transmitting beam in the vertical direction can be determined more quickly by performing such beam training.

In some embodiments, the geographical position information of the terminal device may be acquired by a positioning system such as GPS. In some other embodiments, a macrocell base station acquires the position information of the terminal device through a low-frequency band control signal, and the microcell base station acquires the position information of the terminal device from a macrocell through a backhaul link (e.g., a millimeter wave backhaul link), so as to determine the transmitting order for the plurality of transmitting beams of the base station in the beam sweeping to be performed according to the position information.

It should be understood that the acquisition of the geographical position information of the terminal device is not limited to the manner described in the present invention, and the geographical position information of the terminal device may be acquired in other manners.

FIG. 5 illustrates a case where the beam training method of the present disclosure is applied to downlink communication of the wireless communication system 5000 in which the first communication device is a base station and the second communication device is a terminal device. It should be understood that the beam training scheme according to the present disclosure is equally applicable in uplink communication of a wireless communication system in which the first communication device is a terminal device and the second communication device is a base station.

The cases where the priori information is the number-of-times recording information of the transmitting beams and the geographical position information are described above with reference to FIGS. 4 and 5, respectively. In accordance with some embodiments of the present disclosure, the priori information may include both the number-of-times recording information of the transmitting beams and the geographical position information. An embodiment in which the transmitting order for the transmitting beams is determined based on the number-of-times recording information of the transmitting beams and the geographical position information will be described in further detail below with reference to FIGS. 5 and 6.

Figure 6:
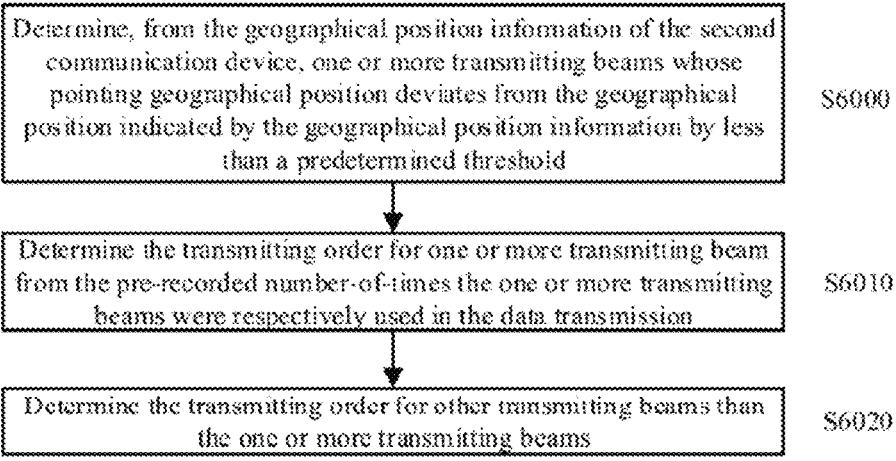
FIG. 6 is an exemplary flow diagram illustrating a first communication device determining a transmitting order of transmitting beams according to an embodiment of the present disclosure.

FIG. 6 is an exemplary flow diagram illustrating a first communication device determining a transmitting order of the transmitting beams according to an embodiment of the present disclosure. The first communication device corresponds to, for example, the base station 5002 in FIG. 5, and the second communication device corresponds to, for example, the terminal device 5004 in FIG. 5.

In step S6000, the base station 5002 determines, from the geographical position information of the terminal device 5004, one or more transmitting beams whose pointing geographical position deviates from the geographical position indicated by the geographical position information by less than a predetermined threshold (e.g., the deviation of the direction is less than 0). As shown in FIG. 5, the determined one or more transmitting beams is a set of transmitting beams $\{5006_2, 5006_3, 5006_4\}$.

In step S6010, the base station determines the transmitting order of each transmitting beam in the set of transmitting beams $\{5006_2, 5006_3, 5006_4\}$ from the number-of-times recording information of each transmitting beam in the set of transmitting beams. In some embodiments, the base station may determine the transmitting order of each transmitting beam in the set of transmitting beams from the number-of-times recording information of the transmitting beams. For example, the base station may arrange the transmitting order of the transmitting beam used greater number of times earlier. In some other embodiments, the base station may determine the transmitting order of each transmitting beam in the set of transmitting beams based on the geographical position information of the terminal device. For example, the base station may arrange the transmitting order of the transmitting beam whose pointing direction is closer to the pointing direction of the arrow 5008 earlier.

In step S6020, the base station determines the transmitting order for the transmitting beams outside the set of transmitting beams. In some embodiments, the base station may not queue the transmitting beams outside the set of transmitting beams, i.e., not use these transmitting beams for beam sweeping. In some other embodiments, the base station may queue the transmitting beams outside the set of transmitting beams after all transmitting beams inside the set of transmitting beams. In addition, as for the transmitting order for the transmitting beams outside the set of transmitting beams, the transmitting order of the transmitting beams may be determined according to the number-of-times recording information of the transmitting beams, or the transmitting order of the transmitting beams may be determined according to the geographical position information.

Embodiments of determining the transmitting order of the transmitting beams according to the priori information are described above with reference to FIGS. 4 to 6. After the transmitting order is determined, the first communication device controls to use the plurality of transmitting beams in the beam sweeping according to the determined transmitting order.

In some embodiments, the first communication device adjusts the time sequence in which the plurality of transmitting beams are transmitted according to the determined transmitting order such that the transmitting beam whose transmitting order is arranged earlier is transmitted first. In addition, the first communication device may adjust time-frequency resources occupied by each transmitting beam according to the transmitting order. In some embodiments, for each target beam to be transmitted, the first communication device may adjust a phase value combination of phase shifters of multiple antennas for generating the target beam and transmit the target beam on the adjusted time-frequency resources for beam sweeping.

According to some embodiments of the present disclosure, the plurality of transmitting beams may be used for beam sweeping according to the determined transmitting order, in a synchronization phase of communication from the first communication device to the second communication device. The beam training performed in the synchronization phase is hereinafter referred to as synchronization phase beam training.

In a downlink synchronization phase, the base station may transmit a plurality of downlink synchronization signals (SSs) to a plurality of terminal devices in the cell using a plurality of transmitting beams to perform downlink synchronization. The plurality of downlink SSs form a downlink SS Block that can cover the range of the entire cell. In some embodiments, the base station may transmit the plurality of downlink SSs to a plurality of terminal devices in the cell using a plurality of transmitting beams according to the determined transmitting order, to perform downlink synchronization phase beam training.

In the uplink synchronization phase, the terminal device may perform uplink synchronization with the base station through an uplink physical random access signal (PRACH). In some embodiments, the terminal device may transmit PRACH to the base station using a plurality of transmitting beams according to the determined transmitting order, thereby performing uplink synchronization phase beam training.

According to some embodiments of the present disclosure, a plurality of transmitting beams may be used for beam sweeping according to the determined transmitting order in a data transmission phase of communication from the first communication device to the second communication device. The beam training performed in the data transmission phase is hereinafter referred to as data transmission phase beam training.

In the downlink data transmission phase, the base station may transmit a CSI-RS (Channel State Information Reference Signal) to each terminal device to measure the downlink channel state. In some embodiments, the base station may transmit the CSI-RS to the terminal device using a plurality of transmitting beams according to the determined transmitting order, thereby performing downlink data transmission phase beam training.

In the uplink data transmission phase, the terminal device may transmit a SRS (Sounding Reference Signal) to the base station to measure the uplink channel quality. In some embodiments, the terminal device may transmit the SRS to the base station according to the determined transmitting order, thereby performing beam training in the uplink data transmission phase.

According to the embodiment of the present disclosure, the beam training in the synchronization phase and the data transmission phase may be performed separately or in combination. In some embodiments, after the synchronization phase beam training, the data transmission phase beam training may be performed using the results of the synchronization phase beam training. Such beam training is hereinafter referred to as two-phase beam training. The two-phase beam training according to the present disclosure will be described in detail with reference to FIGS. 7 and 8.

Figure 7:
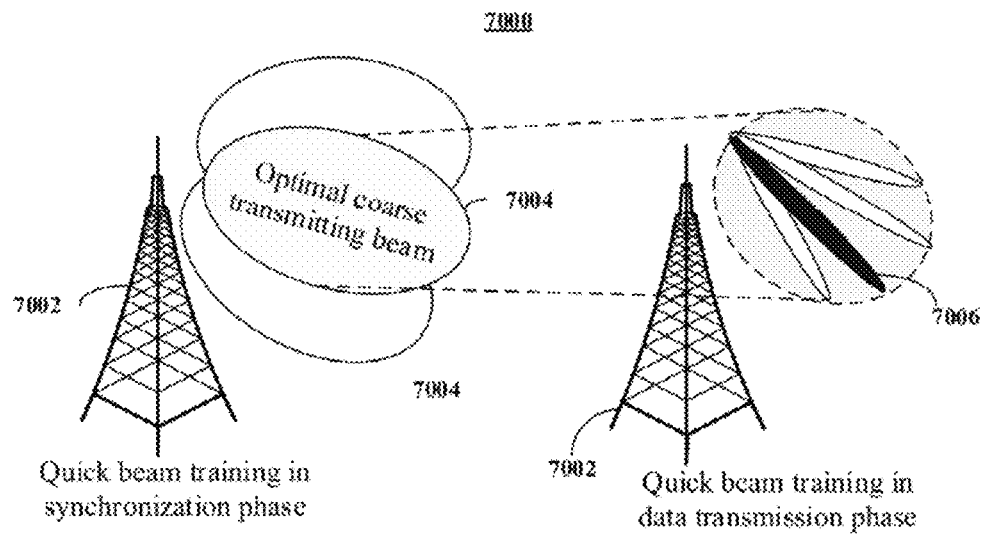
FIG. 7 is a schematic diagram illustrating an example of two-phase beam training according to an embodiment of the present disclosure.

FIG. 7 illustrates an exemplary schematic diagram of two-phase beam training. As shown in FIG. 7, the base station 7002 performs synchronization phase beam training using a coarse transmitting beam and performs data transmission phase beam training using a fine transmitting beam. In addition, for simplicity of illustration, the terminal device is not depicted in FIG. 7.

Figure 8:
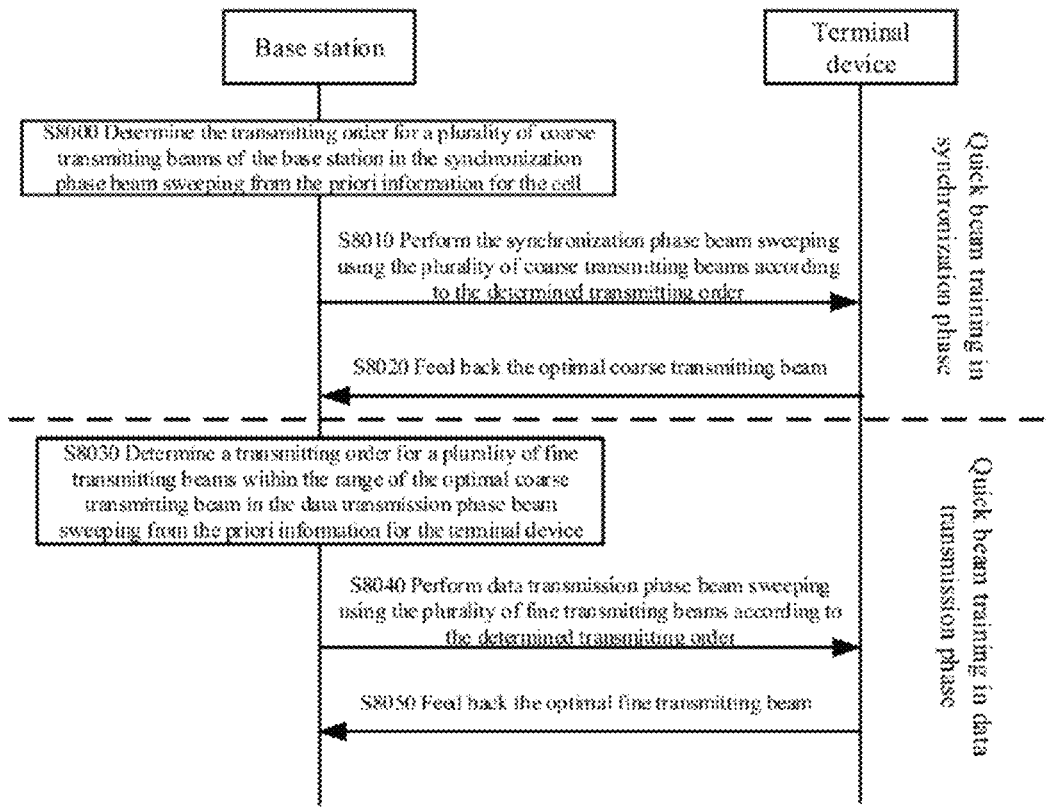
FIG. 8 is an exemplary signaling diagram illustrating two-phase beam training according to an embodiment of the present disclosure.

FIG. 8 illustrates an exemplary signaling diagram of two-phase beam training, wherein steps S8000-S8020 are for synchronization phase beam training and steps S8030-S8050 are for data transmission phase beam training.

In the synchronization phase beam training, in step S8000, the base station 7002 determines the transmitting order for a plurality of coarse transmitting beams of the base station 7002 in the synchronization phase beam sweeping based on the priori information for the cell. In some embodiments, the priori information for the cell may include cell-specific number-of-times recording information and/or geographical position information of terminal devices in the cell.

In step S8010, the base station 7002 performs the synchronization phase beam sweeping using the plurality of coarse transmitting beams according to the determined transmitting order. In some embodiments, the base station 7002 may transmit a plurality of downlink synchronization signals to a plurality of terminal devices within the cell using the plurality of coarse transmitting beams for synchronization phase beam sweeping.

The above steps S8000 and S8010 may correspond to the steps S3000 and S3010 described above with reference to FIG. 3, respectively.

In step S8020, the terminal device feeds back the optimal coarse transmitting beam to the base station. In some embodiments, the terminal device measures the downlink synchronization signal, and feeds back the optimal coarse transmitting beam according to the measuring result. An optimal coarse transmitting beam 7004 fed back from the terminal device to the base station 7002 is shown in FIG. 7.

In the data transmission phase beam training, the base station performs beam sweeping using fine transmitting beams within the range of the optimal coarse transmitting beam 7004 determined by the synchronization phase beam training.

Specifically, in step S8030, the base station 7002 determines a transmitting order for a plurality of fine transmitting beams within the range of the optimal coarse transmitting beam 7004 in the data transmission phase beam sweeping based on the priori information for the terminal device. In some embodiments, the priori information for the terminal device may include the UE-specific number-of-times recording information and/or geographical position information of the second terminal device.

In step S8040, the base station 7002 performs data transmission phase beam sweeping using the plurality of fine transmitting beams according to the determined transmitting order. In some embodiments, the base station 7002 may transmit CSI-RS to the terminal device using the plurality of fine transmitting beams for performing data transmission phase beam sweeping.

The above steps S8000 and S8010 may correspond to the steps S3000 and S3010 described above with reference to FIG. 3, respectively.

In step S8050, the terminal device feeds back the optimal fine transmitting beam to the base station. In some embodiments, the terminal device measures the CSI-RS and feeds back the optimal fine transmitting beam according to the measuring result. An optimal fine transmitting beam 7006 fed back from the terminal device to the base station 7002 is shown in FIG. 7.

FIGS. 7 and 8 illustrate a process of two-phase beam training in downlink communication. It should be understood that the two-phase beam training according to the embodiments of the present disclosure may also be used in uplink communication. In uplink communication, a terminal device may transmit the PRACH using a plurality of coarse transmitting beams for performing synchronization phase beam sweeping, so as to determine an optimal coarse transmitting beam. Next, the terminal device transmits the SRS using the plurality of fine transmitting beams within the range of the optimal coarse transmitting beam to perform data transmission phase beam sweeping, so as to determine the optimal fine transmitting beam.

In addition, in the synchronization phase, there are usually a small number of coarse transmitting beams, and when the system overhead and the delay allow, instead of the beam training, a traditional beam training as shown in FIG. 1 may be performed. In the data transmission stage, the beam training in the data transmission phase is performed according to the result of the traditional beam training in the synchronization phase.

Figure 9:
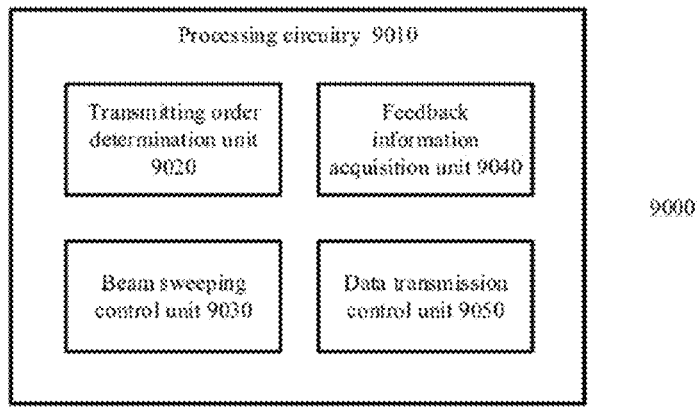
FIG. 9 is a block diagram illustrating an exemplary configuration of an electronic device for a first communication device side according to an embodiment of the present disclosure.

FIG. 9 is a block diagram illustrating an exemplary configuration of an electronic device 9000 for a first communication device side according to an embodiment of the present disclosure.

In some embodiments, the electronic device 9000 may comprise processing circuitry 9010. The processing circuit 9010 of the electronic device 9000 provides various functions of the electronic device 9000. In some embodiments, the processing circuitry 9010 of the electronic device 9000 may be configured to perform a communication method for the electronic device 9000 used in the first communication device side.

The electronic device 9000 has the same configuration as the electronic device 2000 described above with reference to FIG. 2 except that it further includes a feedback information acquisition unit 9040 and a data transmission control unit 9050, wherein the transmitting order determination unit 9020 and the beam sweeping control unit 9030 correspond to the transmitting order determination unit 2020 and the beam sweeping control unit 2030 in FIG. 2, respectively. In some embodiments, the transmitting order determination unit 9020, the beam sweeping control unit 9030, the feedback information acquisition unit 9040, and the data transmission control unit 9050 are respectively configured to execute steps S10000 to S10030 in a communication method of the electronic device 9000 used in the first communication device side illustrated in FIG. 10 described later.

Figure 10:
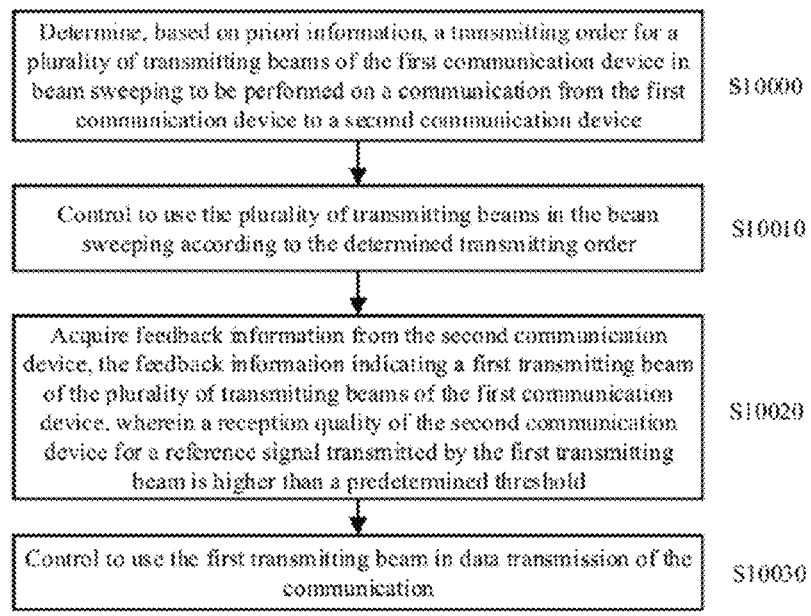
FIG. 10 is an exemplary flowchart illustrating a communication method for a first communication device side according to an embodiment of the present disclosure.

FIG. 10 is an exemplary flowchart illustrating a communication method for use in the first communication device side according to an embodiment of the present disclosure. This communication method can be used for the electronic device 9000 as shown in FIG. 9, for example.

Steps S10000 and S10010 in FIG. 10 correspond to steps S3000 and S3010 described with reference to FIG. 3, respectively, and are not described again here.

In step S10020, the first communication device acquires feedback information from the second communication device, the feedback information indicating a first transmitting beam of the plurality of transmitting beams of the first communication device, wherein a reception quality of the second communication device for a reference signal transmitted by the first transmitting beam is higher than a predetermined threshold jt. In step S10030, the first communication device controls to use the first transmitting beam in data transmission of the communication.

In this embodiment, since an appropriate transmitting beam for use in data transmission of the communication can be determined without the need of sweeping all the transmitting beams, the speed of beam sweeping can be increased and the system delay can be reduced.

In some embodiments, the predetermined threshold $\mu$ may be set appropriately to dynamically adjust between the beam training overhead and the beamforming gain. When the predetermined threshold $\mu$ is set high, the fed-back first transmitting beam may be an optimal transmitting beam. Accordingly, the overhead of the beam sweeping required to feed back the first transmitting beam may also be large. When the predetermined threshold $\mu$ is set low, the fed-back first transmitting beam may not be the optimal transmitting beam but an available beam that can be used for the service and satisfies the required reception quality. Accordingly, the overhead of beam sweeping required to feed back such a first transmitted beam may be small.

In addition, when the first communication device provides $n_t$ orthogonal transmitting beams using $n_t$ transmit antennas, an optimal transmitting beam can be obtained by selecting an appropriate predetermined threshold $\mu$. However, when oversampling occurs, i.e., $n_t$ transmit antennas provide more than $n_t$ transmitting beams (e.g., $n_t$ transmit antennas provide $4n_t$ transmitting beams at four-times oversampling), selecting the predetermined threshold $\mu$ generally cannot result in an optimal transmitting beam, but may result in an available transmitting beam that can be used for the service and satisfies the required reception quality.

In some embodiments, the predetermined threshold $\mu$ may be determined by the second communication device. For example, the second communication device may determine the predetermined threshold µ that satisfies its own reception quality requirement according to the condition of the communication channel. In further embodiments, the predetermined threshold µ may be notified by the first communication device to the second communication device. For example, in case where the first communication device is a base station and the second communication device is a terminal device, the predetermined threshold µ may be notified to each terminal device by the base station in accordance with the conditions of a plurality of terminal devices in the cell.

In some embodiments, the reference signal transmitted by the first transmitting beam may be one of an SS, a PRACH, a CSI-RS, an SRS, depending on whether the communication from the first communication device to the second communication device is a downlink communication or an uplink communication, a synchronization phase communication or a data transmission phase communication. In addition, the reference signal is not limited to the types as listed above, and those skilled in the art may adopt different reference signals according to actual conditions of the wireless communication system.

Table 2 illustrates the reception quality of receiving, by the second communication device, the reference signals transmitted by the transmitting beams of different transmitting orders of the first communication device. Assuming that the predetermined threshold µ=1, then the reception quality Q by the second communication device for the reference signal of the transmitting beam whose transmitting order is "2" is 1.1 which is larger than the predetermined threshold µ, so the transmitting beam whose transmitting order is "2" is determined as the first transmitting beam, and feedback information indicating the first transmitting beam is transmitted to the first communication device.

TABLE 2

| Transmitting order | 1 | 2 | 3 | 4 |
| --- | --- | --- | --- | --- |
| Reception quality Q | 0.8 | 1.1 | 1.2 | 0.5 |

In some embodiments, the feedback information may include information indicating the transmitting order of the first transmitting beam, such as the transmitting order "2" of the first transmitting beam shown in Table 2. The feedback information may also include information indicating an index of the first transmitting beam. For example, it can be learned with reference to Table 1 that, the transmitting beam whose transmitting order is "2" is $4006_2$, and the feedback information may include index information of the transmitting beam $4006_2$. The feedback information may also include information indicating an antenna port to which the first transmitting beam (e.g., the transmitting beam $4006_2$) corresponds. In addition, the feedback information may also include a CSI-RS Resource Indicator (CRI) for indicating the first transmitting beam (e.g., the transmitting beam $4006_2$).

In some embodiments, the reception quality by the second communication device for the reference signal transmitted by a transmitting beam whose transmitting order precedes the first transmitting beam is below the predetermined threshold µ. For example, as shown in Table 2, when the reception quality for the reference signal is above the predetermined threshold µ=1 for the first time, the transmitting beam (the transmitting order is "2") corresponding to the reference signal is determined as the first transmitting beam, and feedback is made to the first communication device.

In some embodiments, the first communication device stops beam sweeping when the first communication device acquires the feedback information from the second communication device. In this embodiment, the first communication device may use the first transmitting beam for data transmission without continuing beam sweeping with other transmitting beams, thereby reducing the beam training overhead. Since the transmitting order of the transmitting beams is determined based on the priori information, and it is more likely that the reception quality for the reference signal transmitted by the transmitting beam with an earlier transmitting order is higher than the reception quality for the reference signal transmitted by the transmitting beam with a later transmitting order, even if the remaining transmitting beams are not swept after it is determined to use the transmitting beam corresponding to the reference signal with the reception quality above the predetermined threshold, it can be substantially ensured that the transmitting beams whose qualities rank ahead are used.

In some other embodiments, the first communication device continues to perform the beam sweeping while the first communication device acquires the feedback information from the second communication device. For example, in case where the first communication device is a base station and the second communication device is a terminal device, when the base station acquires feedback information from one terminal device, the base station may continue performing beam sweeping for other terminal devices in a cell controlled by the base station.

In some embodiments, a second transmitting beam whose transmitting order precedes the first transmitting beam, among the transmitting beams, may be used as an candidate transmitting beam for beam switching, wherein the reception quality for the second transmitting beam by the second communication device is second only to the reception quality for the first transmitting beam. For example, the transmitting beam whose transmitting order is "1" shown in Table 2 may serve as the second transmitting beam, i.e., a candidate transmitting beam for beam switching, and in case where the first transmitting beam whose transmitting order is "2" cannot be normally used, it is switched to use the second transmitting beam.

In some embodiments, when the optimal reception quality, by the plurality of receiving beams of the second communication device, for the reference signal transmitted by the first communication device is above the predetermined threshold µ, the transmitting beam of the first communication device corresponding to the reference signal is determined as the first transmitting beam and fed back to the first communication device. This embodiment is applicable to an open-area wireless communication system (e.g. communication between base station and a drone) where a line-of-sight channel between the first communication device and the second communication device is a primary scenario.

In some embodiments, when an average reception quality, by the plurality of receiving beams of the second communication device, for the reference signal transmitted by the same transmitting beam of the first communication device is above the predetermined threshold µ, the transmitting beam is determined to be the first transmitting beam and fed back to the first communication device. This embodiment is applicable to a non-open-area wireless communication system where a non-line-of-sight channel between the first communication device and the second communication device is a primary scenario, and in such a wireless communication system, the second communication device may move and rotate frequently, or the like.

Embodiments in which the beam training scheme based on the priori information of the present disclosure is used in the first communication device side are described above with reference to FIGS. 2-10. The beam training scheme of the present disclosure can also be used in the second communication device side, and will be described in detail with reference to FIGS. 11 to 14 below.

Figure 11:
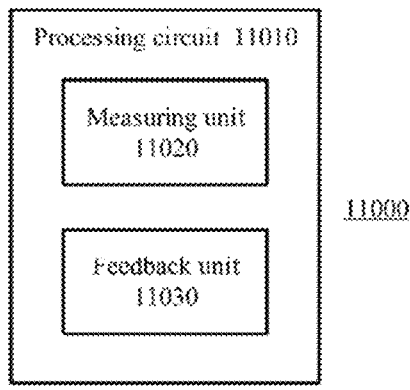
FIG. 11 is a block diagram illustrating an exemplary configuration of an electronic device for a second communication device side according to an embodiment of the present disclosure.

FIG. 11 is a block diagram illustrating an exemplary configuration of an electronic device 11000 used in the second communication device side according to an embodiment of the present disclosure.

In some embodiments, the electronic device 11000 may include processing circuitry 11010. The processing circuitry 11010 of the electronic device 11000 provides various functions of the electronic device 11000. In some embodiments, the processing circuitry 11010 of the electronic device 11000 may be configured to perform a communication method of the electronic device 11000 used in the second communication device side.

The processing circuitry 11010 may refer to various implementations of digital circuitry, analog circuitry, or mixed-signal (a combination of analog and digital) circuitry that performs functions in a computing system. The processing circuitry may include, for example, circuitry such as an Integrated Circuit (IC), an Application Specific Integrated Circuit (ASIC), portions or circuits of an individual processor core, an entire processor core, an individual processor, a programmable hardware device such as a Field Programmable Gate Array (FPGA), and/or a system including multiple processors.

In some embodiments, the processing circuit 11010 may include a measuring unit 11020 and a feedback unit 11030 configured to perform step S12000 and step S12010, respectively, in a communication method of the electronic device 11000 used in the second communication device side shown in FIG. 12 described later.

In some embodiments, the electronic device 11000 may also include memory (not shown). The memory of the electronic device 11000 may store information generated by the processing circuit 11010 as well as programs and data used for operation of the electronic device 11010. The memory may be volatile memory and/or non-volatile memory. For example, memory may include, but is not limited to, Random Access Memory (RAM), Dynamic Random Access Memory (DRAM), Static Random Access Memory (SRAM), Read Only Memory (ROM), and flash memory.

In addition, the electronic device 11000 may be implemented at a chip level, or may also be implemented at a device level by including other external components. In some embodiments, the electronic device 11000 may be implemented as a second communication device as a whole, and may further include a plurality of antennas.

It should be understood that the above units are only logic modules divided according to specific functions realized by the units, and are not used for limiting specific implementations. In an actual implementation, the above units may be implemented as separate physical entities, or may also be implemented by a single entity (e.g., a processor (CPU or DSP, etc.), an integrated circuit, etc.).

Figure 12:
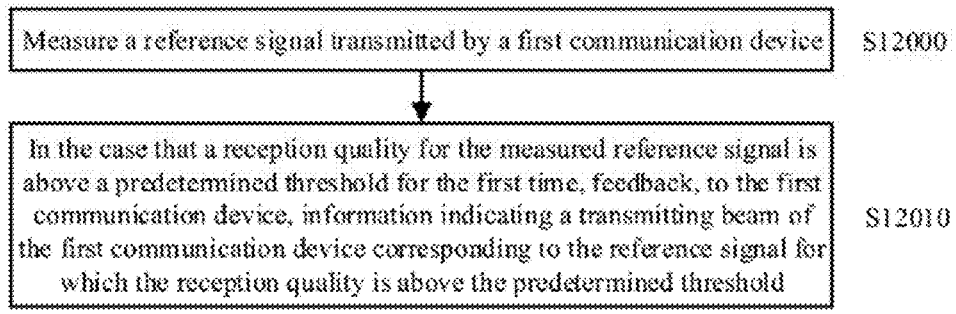
FIG. 12 is an exemplary flowchart illustrating a communication method for a second communication device side according to an embodiment of the present disclosure.

FIG. 12 is an exemplary flowchart illustrating a communication method for use in the second communication device side according to an embodiment of the present disclosure.

The communication method can be used for the electronic device 11000 shown in FIG. 11, for example.

As shown in FIG. 12, in step S12000, the second communication device measures the reference signal transmitted by the first communication device. In step S12010, in a case where the reception quality for the measured reference signal is above the predetermined threshold $\mu$ for the first time, information indicating a transmitting beam of the first communication device corresponding to the reference signal whose reception quality is above the predetermined threshold $\mu$ is fed back to the first communication device.

For example, in one example, as described above with reference to Table 2, when the reception quality Q for the reference signal of the transmitting beam whose transmitting order is "2" is 1.1 that is above the predetermined threshold $\mu=1$, the information on the transmitting beam whose transmitting order is "2" is fed back to the first communication device.

In some embodiments, in case where the reception quality for the reference signal by the second communication device is above the predetermined threshold $\mu$ for the first time, the second communication device may stop receiving the reference signal transmitted by the transmitting beam of the first communication device. For example, the second communication device may stop receiving the reference signals transmitted by the transmitting beams whose transmitting orders are "3" and "4". According to the embodiment, the second communication device can complete the beam sweeping process without the need of receiving the reference signals transmitted by all the transmitting beams, thereby reducing the beam training overhead.

In some embodiments, the second communication device feeds back without waiting for transmitting beams after the transmitting beam of the first communication device corresponding to the reference signal for which the reception quality is above the predetermined threshold. In this embodiment, when the reception quality for the reference signal is higher than the predetermined threshold $\mu$ for the first time, the second communication device performs feedback to the first communication device (for example, feeding back the transmitting beam with the transmitting order of "2" without waiting for the transmitting beams with the transmitting orders of "3" and "4" after the transmitting order of "2"), and the first communication device may receive the feedback from the second communication device before the beam sweeping process is finished, thereby performing the corresponding process in advance.

In some embodiments, the second communication device does not feed back information indicating a transmitting beam after the transmitting beam of the first communication device corresponding to the reference signal for which the reception quality is above the predetermined threshold $\mu$. For example, the second communication device may not feed back information on the transmitting beams with the transmitting orders of "3" and "4" to the first communication device, even if the reception quality for the reference signal transmitted by the transmitting beam with the transmitting order of "3" is above the reception quality for the reference signal transmitted by the transmitting beam with the transmitting order of "2". By setting the predetermined threshold $\mu$ appropriately, after finding the transmitting beam corresponding to the reference signal for which the reception quality is above the predetermined threshold $\mu$, it can be determined that the transmitting beam can satisfy the service requirement, and thus, other transmitting beams after the transmitting beam can no longer be fed back to the first communication device.

In some embodiments, the first communication device is a base station, the second communication device is a terminal device, and the communication from the first communication device to the second communication device is downlink communication. In some further embodiments, the first communication device is a terminal device, the second communication device is a base station, and the communication from the first communication device to the second communication device is an uplink communication.

According to the embodiment of the present disclosure, the beam training scheme based on the priori information according to the present disclosure can be used in the second communication device side, and the priori information is used to determine the receiving order for the plurality of receiving beams of the second communication device, so that a suitable receiving beam can be determined more quickly in the beam sweeping. This will be specifically described with reference to FIGS. 13 and 14 in the following.

Figure 13:
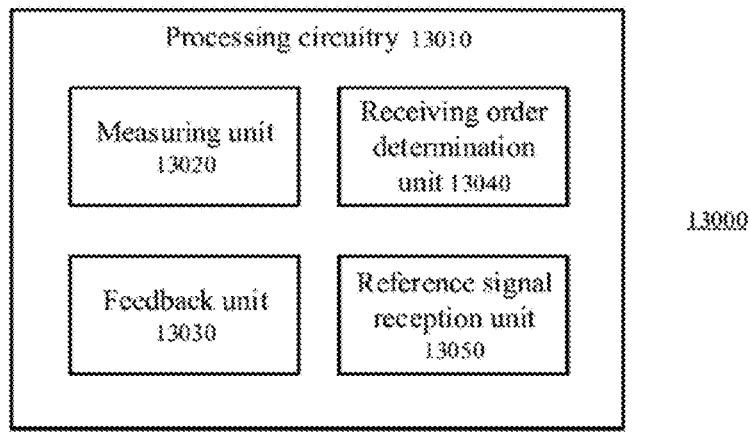
FIG. 13 is a block diagram illustrating an exemplary configuration of an electronic device for a second communication device side according to an embodiment of the present disclosure.

FIG. 13 is a block diagram illustrating an exemplary configuration of an electronic device 13000 used in the second communication device side according to an embodiment of the present disclosure.

In some embodiments, the electronic device 13000 can include processing circuitry 13010. The processing circuitry 13010 of the electronic device 13000 provides various functions of the electronic device 13000. In some embodiments, the processing circuitry 13010 of the electronic device 13000 can be configured to perform a communication method of the electronic device 13000 used in the second communication device side.

As compared with the electronic device 11000 described above with reference to FIG. 11, the electronic device 13000 has the same configuration as the electronic device 11000 except that it further includes a receiving order determination unit 13040 and a reference signal reception unit 13050, where the measuring unit 13020 and the feedback unit 13030 correspond to the measuring unit 11020 and the feedback unit 11030 in FIG. 11, respectively.

In some embodiments, the measuring unit 13020, the feedback unit 13030, the receiving order determination unit 13040, and the reference signal reception unit 13050 are configured to perform steps S14000 to S14030, respectively, in the communication method of the electronic device 13000 used in the second communication device side shown in FIG. 14 described later.

Figure 14:
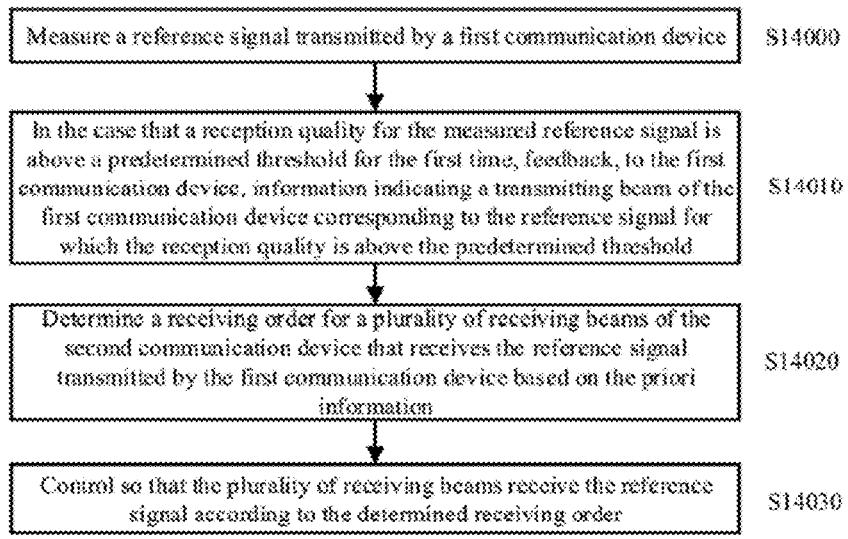
FIG. 14 is an exemplary flowchart illustrating a communication method for a second communication device side according to an embodiment of the present disclosure.

FIG. 14 shows an exemplary flowchart of a communication method for use in the second communication device side according to an embodiment of the present disclosure. The communication method can be used for the electronic device 13000 shown in FIG. 13, for example.

Steps S14000 and S14010 in FIG. 14 correspond to steps S12000 and S12010, respectively, described with reference to FIG. 12, and thus are not repeated herein.

In step S14020, the second communication device determines a receiving order for a plurality of receiving beams of the second communication device that receives the reference signal transmitted by the first communication device based on the priori information. In step S14030, the second communication device controls so that the plurality of receiving beams receive the reference signal according to the determined receiving order.

The priori information may be directly obtained by the second communication device through pre-recording, pre-measuring, etc. The priori information may also be notified by the first communication device to the second communication device. The priori information may also be obtained by the second communication device from other devices than the first communication device. In addition, the priori information may be recorded simultaneously on the first communication device side and the second communication device side.

According to the embodiments of the present disclosure, the receiving order for a plurality of receiving beams that receive the reference signal transmitted by the first communication device is determined based on the priori information and the reference signal is received in the determined receiving order, which enables an appropriate receiving beam to be determined more quickly in the beam sweeping.

In some embodiments, the priori information may include pre-recorded number of times that the plurality of receiving beams were used in the data transmission respectively. Hereinafter, this priori information is sometimes referred to as number-of-times recording information of the receiving beam.

In some embodiments, the receiving order for the receiving beams may be determined based on the number-of-times recording information of the receiving beams such that the receiving order of the receiving beams that were used more times is earlier.

Table 3 illustrates a case where the receiving order is determined from the number-of-times recording information of the receiving beam. The number-of-times information of the receiving beams $r_1$~$r_4$ is 10, 20, 25 and 15, respectively. The second communication device arranges the receiving order of the receiving beams 1 to 4 in a descending order according to the number-of-times recording information, that is, the receiving order for the receiving beams 1 to 4 is 4, 2, 1 and 3 respectively. Next, the second communication device receives the reference signal in turn according to the determined receiving order.

TABLE 3

| Receiving beam | $r_1$ | $r_2$ | $r_3$ | $r_4$ |
|---|---|---|---|---|
| Number-of-times recording information | 10 | 20 | 25 | 15 |
| Receiving order | 4 | 2 | 1 | 3 |

By means of the above beam training scheme, the receiving beam that was used more times can be used to receive the reference signal earlier, so that an appropriate receiving beam can be determined more quickly.

It should be understood that the transmitting order shown in Table 3 is only an example but not a limitation, the receiving order determined according to the number-of-times recording information of the receiving beams is not limited to the receiving order described herein, and those skilled in the art can design a rule for the receiving order based on the priori information according to actual situations of the communication system under the teaching of the present disclosure.

In addition, the number-of-times recording information of the transmitting beam described above for the transmitting beam of the first communication device can also be applied to the number-of-times recording information of the receiving beam of the second communication device as well.

In some embodiments, the beam training scheme based on the priori information according to the present invention may be used on the first communication device side and the second communication device side, respectively. On the first communication device side, the plurality of transmitting beams transmit the reference signals to the second communication device according to the transmitting order determined based on the priori information, and on the second communication device side, the plurality of receiving beams receive the reference signals from the first communication device according to the receiving order determined based on the priori information. By such a scheme, appropriate transmitting and receiving beams can be determined more quickly in the beam sweeping.

In some embodiments, the priori information may include pre-recorded number of times that transmitting beam—receiving beam pairs (hereinafter referred to as "transmitting-receiving beam pairs") were respectively used in the data transmission. Hereinafter, the priori information is sometimes also referred to as number-of-times recording information of the transmitting-receiving beam pair.

Figure 15:
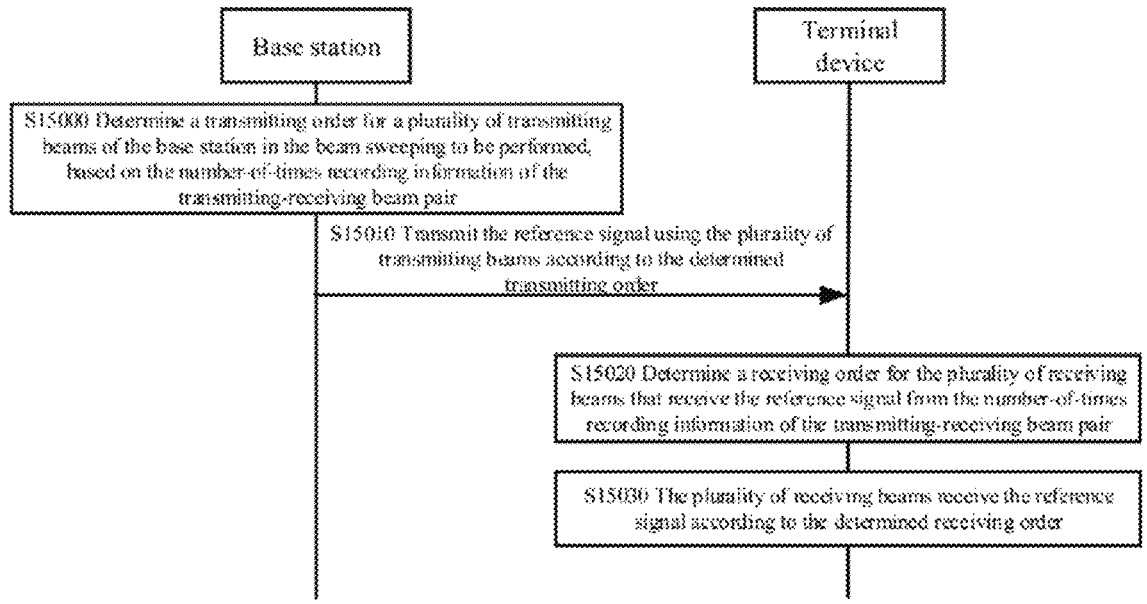
FIG. 15 is an exemplary signaling diagram illustrating beam training based on number-of-times recording information of transmitting-receiving beam pairs according to an embodiment of the present disclosure.

FIG. 15 is an exemplary signaling diagram illustrating beam training based on the number-of-times recording information of the transmitting-receiving beam pair according to an embodiment of the present disclosure.

As shown in FIG. 15, in step S15000, the base station determines a transmitting order for a plurality of transmitting beams of the base station in the beam sweeping to be performed, based on the number-of-times recording information of the transmitting-receiving beam pair. In some embodiments, the transmitting order of the transmitting beam in the beam pair that is used more times in the data transmission may be arranged earlier.

In one example, assuming that transmitting beams of the base station are $t_1$, $t_2$, $t_3$ and $t_4$, and the receiving beams of the terminal device are $r_1$ and $r_2$, then the number-of-times recording information of the transmitting-receiving beam pair are as shown in Table 4 below. In Table 4, the number-of-times recording information of the $t_i$-$r_j$ beam pairs (i=1, 2,3,4, j=1, 2) indicates the number of times the $t_i$-$r_j$ beam pairs is used in data transmission. As shown in Table 4, the number-of-times recording information of the $t_3$-$r_2$ beam pair is the largest, so the transmitting order of the transmitting beam $t_3$ can be arranged at the foremost.

TABLE 4

| | Transmitting beam | | | | | | | |
|---|---|---|---|---|---|---|---|---|
| | t1 | | t2 | | t3 | | t4 | |
| | Receiving beam | | | | | | | |
| | r1 | r2 | r1 | r2 | r1 | r2 | r1 | r2 |
| Number-of-times recording information | 3 | 7 | 12 | 8 | 10 | 15 | 5 | 10 |

In step S15010, the base station transmits the reference signal to the terminal device using the plurality of transmitting beams according to the determined transmitting order to perform beam sweeping.

In step S15020, the terminal device determines a receiving order for the plurality of receiving beams that receive the reference signal from the number-of-times recording information of the transmitting-receiving beam pair. For example, when receiving the reference signal transmitted by the transmitting beam $t_3$, the terminal device may receive the reference signal by arranging the receiving beam $r_2$ with larger number-of times recording information before the receiving beam $r_1$, according to the number-of-times recording information of the transmitting-receiving beam pairs having the transmitting beam $t_3$ (i.e., the number-of-times information of $t_3$-$r_1$ is 12, and the number-of-times information of $t_3$-$r_2$ is 8).

In some embodiments, the terminal device may be notified by the base station of the order of the receiving beams that should be used. In this case, the terminal device may not record and maintain the number-of-times recording information of the transmitting-receiving beam pairs, but receive the reference signals according to the order of the receiving beams notified by the base station. In some other embodiments, the number-of-times recording information of the transmitting-receiving beam pairs may be recorded and maintained at the base station and the terminal device side simultaneously.

In step S15030, the plurality of receiving beams receive the reference signal according to the determined receiving order.

According to the method shown in FIG. 15, the beam training is performed by using the beam recording information of the transmitting-receiving beam pairs, so that appropriate transmitting-receiving beam pairs can be determined more quickly for the subsequent transmission of data and/or control signals.

It should be understood that, the beam training scheme based on the number-of-times recording information of the transmitting-receiving beam pairs shown in FIG. 15 may be used alone in the synchronization phase or the data transmission phase, or may implement a two-phase beam training scheme as shown in FIGS. 7 and 8. In the two-phase beam training scheme based on the number-of-times recording information of the transmit-receiving beam pairs, the priori information may include the number-of-times recording information of the transmitting-receiving beam pairs, and other processing is the same as the embodiment described with reference to FIGS. 7 and 8, and is not repeated herein.

Figure 16:
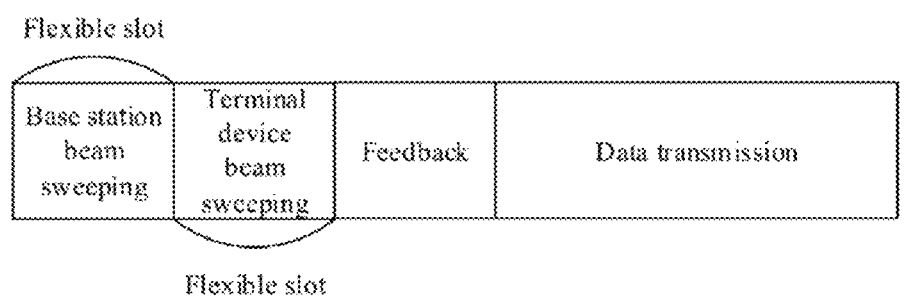
FIG. 16 is a schematic diagram illustrating an example of a frame structure for communication according to an embodiment of the present disclosure.

FIG. 16 is a schematic diagram illustrating an example of a frame structure for communication according to an embodiment of the present disclosure.

In some embodiments of the present disclosure, determining the transmitting order for the transmitting beams of the base station based on the priori information can reduce the beam sweeping overhead of the base station. Likewise, determining the receiving order for the receiving beams of the terminal device for the reference signal based on the priori information can reduce the beam sweeping overhead of the terminal device. In order to accommodate different beam training overheads for different base stations and terminal devices in the present disclosure, the inventors of the present disclosure designed a dedicated frame structure as shown in FIG. 16 to support flexible beam sweeping slots.

The frame structure shown in FIG. 16 includes a base station beam sweeping slot, a terminal device beam sweeping slot, a feedback slot, and a data transmission slot. In addition, other contents in the frame structure are omitted in FIG. 16.

The base station beam sweeping slot may be determined based on the number of the transmitting beams used in the beam sweeping. For example, when as shown in Table 2 the transmitting beam with the transmitting order "2" is determined as the first transmitting beam and feedback is performed, the number of transmitting beams used in the beam sweeping is 2, then the number of base station beam sweeping slots may be 2, which is smaller than the number of the base station transmitting beams $n_t$=4. Similarly, the terminal device beam sweeping slots shown in FIG. 16 may be determined according to the number of the receiving beams used in the beam sweeping, and may also be smaller than the number $n_r$ of the terminal device receiving beams.

Taking the base station beam sweeping slots as an example, assuming that $l_0$ is the transmitting order of the first transmitting beam, then the number of the base station beam sweeping slots is also $l_0$. An average number $\tilde{l}$ of the base station beam sweeping slots for a plurality of terminal devices may be expressed as $$\tilde{l}=E\{l_0\}<n_t \quad \text{[Equation 2]}$$

where $E\{l_0\}$ represents an expectation of $l_0$.

The average number $\tilde{l}$ of the base station beam sweeping slots is related to the priori information. For example, in case where the priori information is the number-of-times recording information of the transmitting beams, $\tilde{l}$ is related to a distribution of a large number of terminal devices over a long period of time. In case where the priori information is geographical position information, $\tilde{l}$ is related to the accuracy of the geographical position information. In addition, $\tilde{l}$ is also related to a predetermined threshold $\mu$.

Next, simulation results of an example of beam training according to an embodiment of the present disclosure are described with reference to FIGS. 17 to 20.

Assuming that the number of antennas and the number of transmitting beams configured on the base station side are both 32, a single antenna is configured on the terminal device side, and only the fine transmitting beams of the base station are subjected to beam training. The beam vector for the ith transmitting beam of the base station may be represented as:

$$b_i = \frac{1}{\sqrt{32}}[1 \quad e^{-j\pi\cos\beta_i} \quad \ldots \quad e^{-(j31\pi\cos\beta_i)}]^T \quad \text{[Equation 3]}$$

where $\beta_i$ is the direction of the ith transmitting beam, and is a uniform quantization of $[30°,150°]$, i.e.

$$\beta_i = \frac{17\pi}{96} + \frac{\pi}{48}i, i = 0, \ldots, 31 \quad \text{[Equation 4]}$$

In a simulation of the example of the present disclosure, the predetermined threshold $\mu$ is set high to ensure that the terminal device can select an optimal transmitting beam without performance loss. The beam training overhead of different schemes can be compared fairly at this point.

Figure 17:
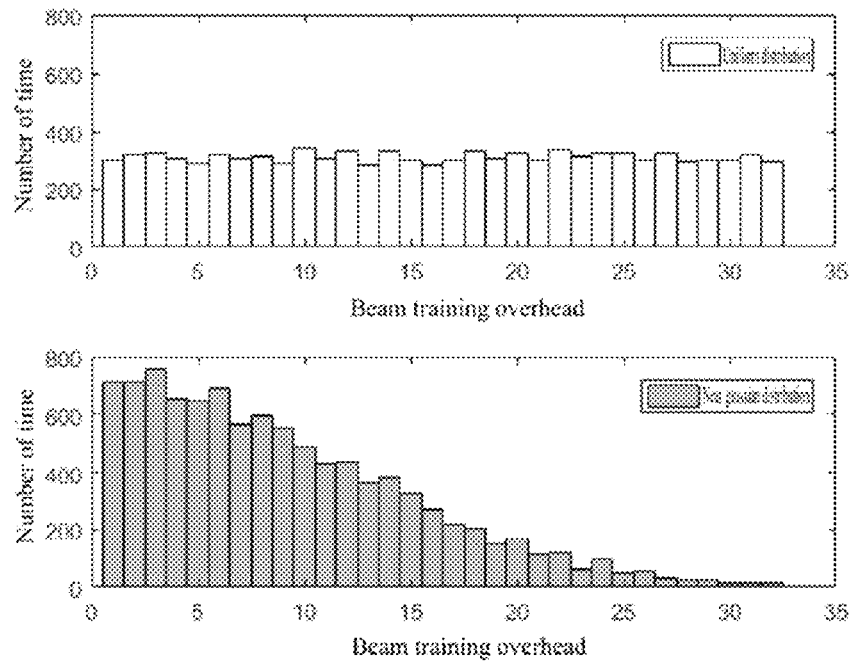
FIGS. 17-20 show simulation results of an example of beam training according to an embodiment of the present disclosure.

FIG. 17 illustrates a comparison in histograms of beam training overheads in two terminal device distribution scenarios, in case where the priori information is the number-of-times recording information of the transmitting beams: in the scenario (1), angles of arrival of the terminal devices are uniformly distributed in $[30°,150°]$; in the scenario (2), the terminal devices are distributed in $[30°,150°]$ in a near gaussian manner, the center thereof is in a 90° direction, and the standard deviation is $\sigma=20°$, that is, most of the terminal devices are distributed in a coverage of the transmitting beams provided by the base station. The horizontal axis of the histogram in FIG. 17 represents the beam training overhead, i.e., the number of beam sweepings performed when the reception quality is higher than the predetermined threshold $\mu$ In addition, the vertical axis of the histogram in FIG. 17 represents the number of times the corresponding beam training overhead occurs.

As shown in FIG. 17, in the near gaussian distribution, as compared with the uniform distribution, larger training overheads occur less frequently and the average beam training overhead is also lower.

Table 4 shows a comparison in the average training overhead, wherein the traditional beam training method is a beam training method that traverses the transmitting beams of the base station as shown in FIG. 1. It can be seen that the beam training method according to the present disclosure can save half of the overhead even in the worst scenario (i.e., normal distribution of the terminal devices), and the average overhead in the near gaussian distribution is $\tilde{l}\approx9.2$.

TABLE 4

| Average overhead $\tilde{l}$ | Traditional beam training method | Beam training method of the present disclosure |
| --- | --- | --- |
| Uniform distribution | 32 | 16.4 |
| Near Gaussian distribution | 32 | 9.2 |

Figure 18:
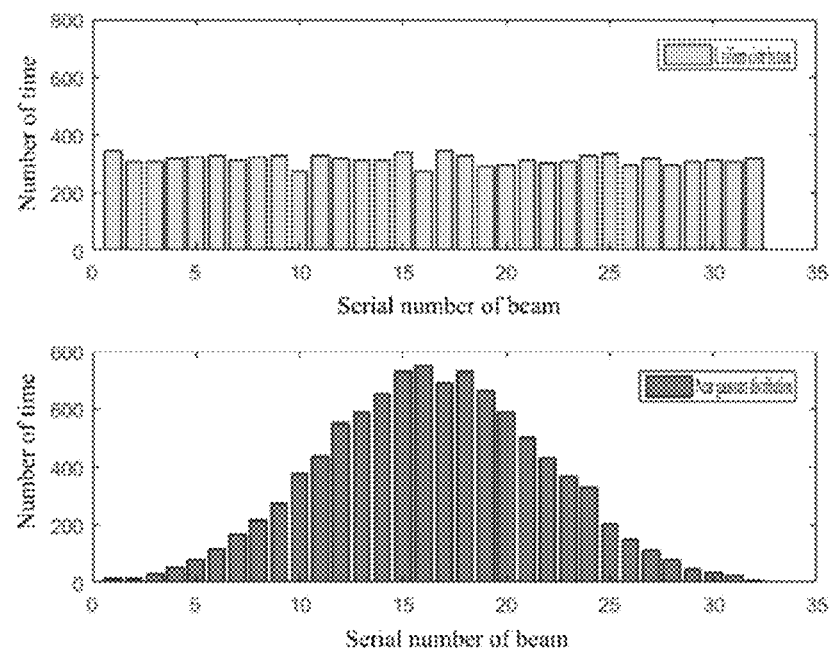

FIG. 18 illustrates histograms of the number of times that 32 transmitting beams of the base station were used in two different scenarios (1) and (2), where the abscissa indicates the serial number of the transmitting beams and the ordinate indicates the number of times the transmitting beams were used.

As shown in FIG. 18, in the scenario where the terminal devices are uniformly distributed, 32 beams are used approximately the same number of times, and in this case, less priori information is generated and is not helpful for subsequent beam training. In the scenario where the terminal devices are in near-Gaussian distribution, the number of times that the transmitting beams were used are also in a Gaussian distribution, more priori beam information is generated and is very helpful for the subsequent beam training, which can reduce the beam training overhead effectively, and further reduce the system delay.

Figure 19:
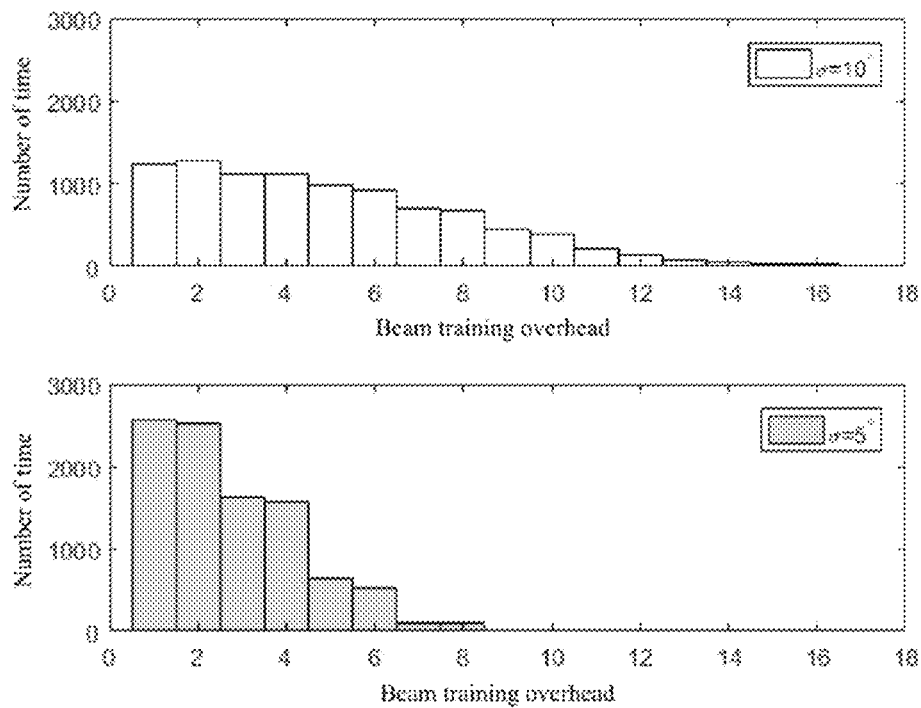

FIG. 19 illustrates a comparison in the overhead of the beam training method in which the priori information is the geographical position information, under different positioning accuracies, where the abscissa indicates the beam training overhead and the ordinate indicates the number of times the corresponding beam training overhead occurs. The positioning accuracy is given by a positioning standard deviation $\sigma$, and the larger $\sigma$, the lower the accuracy, and the larger the training overhead; the smaller $\sigma$, the higher the accuracy, the smaller the training overhead.

Table 5 illustrates a comparison in the average training overhead in which the traditional beam training method is a beam training method that traverses the transmitting beams of the base station as shown in FIG. 1. As can be seen from both FIG. 19 and Table 5, the average training overhead is greatly reduced when $\sigma=5°$.

TABLE 5

| Average overhead $\tilde{l}$ | Traditional beam training method | Beam training method of the present disclosure |
| --- | --- | --- |
| $\sigma = 10°$ | 32 | 5 |
| $\sigma = 5°$ | 32 | 2.8 |

Figure 20:
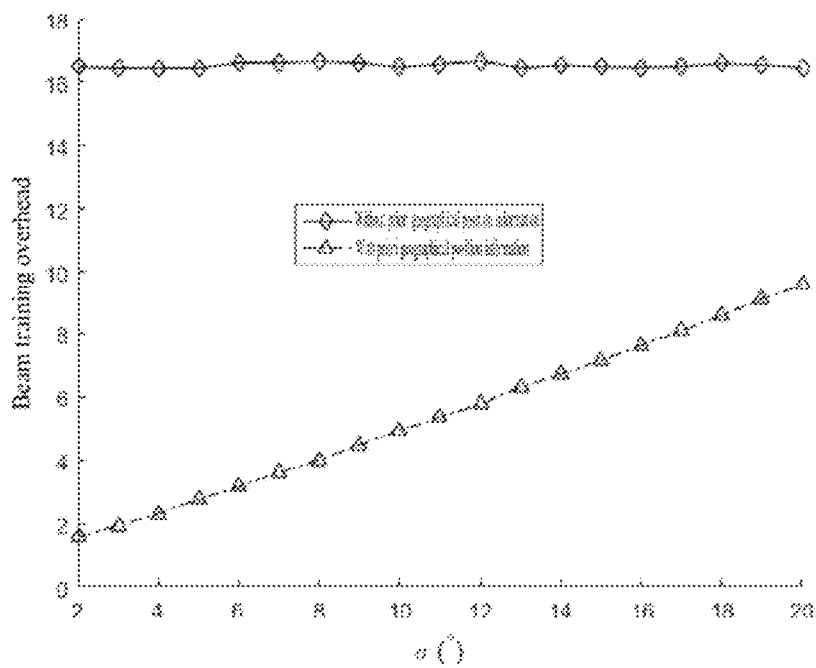

FIG. 20 illustrates a comparison in overhead between a beam training scheme based on the geographical position information and a beam training scheme not based on the geographical position information, where the abscissa represents the positioning standard deviation $\sigma$ and the ordinate represents the beam training overhead. As shown in FIG. 20, the beam training scheme based on the geographical position information has a significantly reduced beam training overhead as compared to the beam training scheme not based on the geographical position information. In addition, in a fast training scheme based on the geographical position information, as the positioning accuracy improves (i.e., the positioning standard deviation σ decreases), the beam training overhead becomes smaller and smaller.

The present disclosure presents a beam training scheme based on the priori information. Beam training is one aspect of beam management. Those skilled in the art, given the teachings of this disclosure, may use the scheme of the present disclosure in other aspects of the beam management, such as beam recovery, beam tracking, and beam calibration, among others.

Application examples according to the present disclosure will be described below.

The technology of the present disclosure can be applied to various products.

For example, the base station may be realized as any type of evolved Node B (eNB) or gNodeB (gNB) in a next generation wireless communicatoin, such as a macro eNB/gNB and a small eNB/gNB. The small eNB/gNB may be an eNB/gNB covering a cell smaller than the macro cell, such as a pico eNB/gNB, a micro eNB/gNB, and a home (femto) eNB/gNB. Alternatively, the base station can be realized as any other types of base stations, such as one or both of a base transceiver station (BTS) and a base station controller (BSC) in the GSM system, may be one or both of a radio network controller (RNC) and NodeB in the WCDMA system, or may be a corresponding node in the future communication system. The base station may include: a main body (that is also referred to as a base station device) configured to control wireless communication; and one or more remote radio heads (RRHs) disposed in a different place from the main body. Additionally, various types of terminals to be discussed later may also operate as a base station by temporarily or semi-persistently executing a base station function.

For example, the terminal device may be realized as a mobile terminal (such as a smart phone, a tablet personal computer (PC), a notebook PC, a portable game terminal, a portable/encrypted dongle type mobile router, and a digital camera apparatus) or an in-vehicle terminal (such as a car navigation device). The terminal device can also be realized as a terminal (that is also referred to as a machine type communication (MTC) terminal) that performs machine-to-machine (M2M) communication. Furthermore, the terminal device may be a wireless communication module (such as an integrated circuit module including a single die) mounted on each of the above terminals.

[Application Examples Regarding Base Station]

First Application Example

Figure 21:
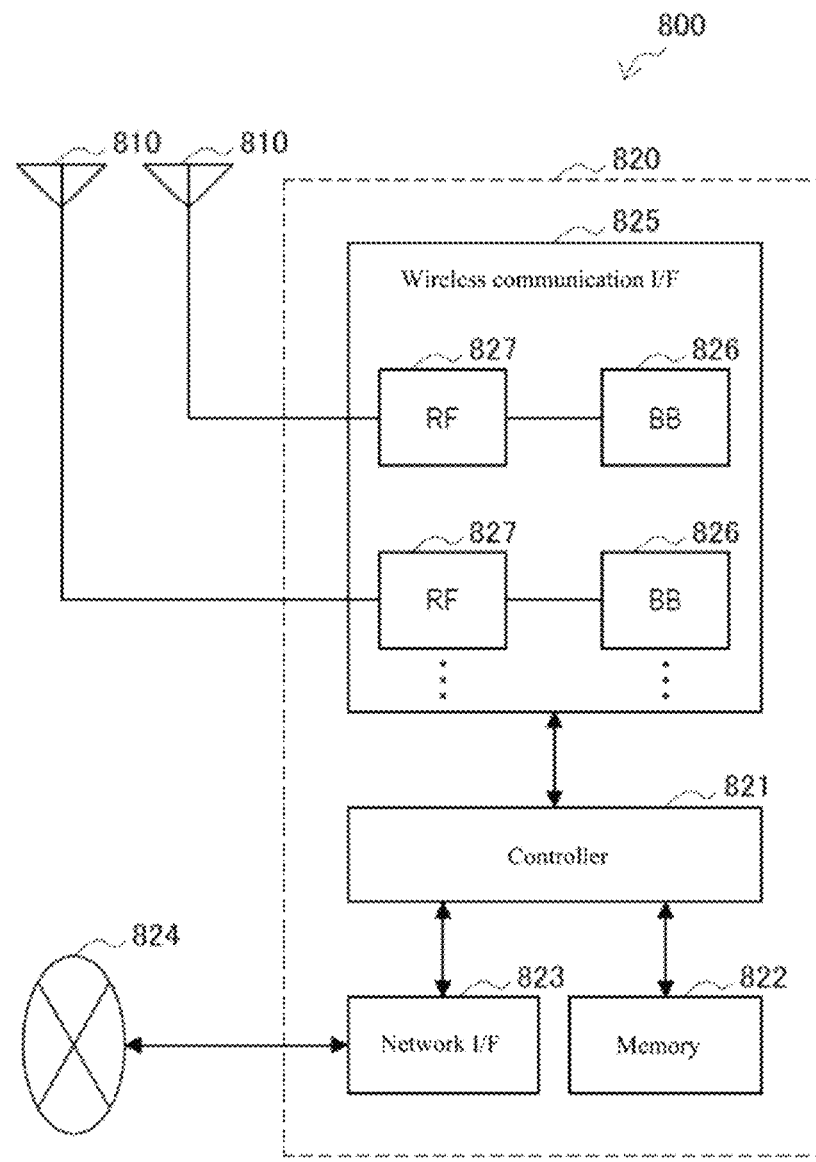
FIG. 21 is a block diagram illustrating a first example of a schematic configuration of gNB according to an embodiment of the present disclosure.

FIG. 21 is a block diagram illustrating a first example of a schematic configuration of an gNB to which the technology of the present disclosure may be applied. The gNB 800 includes one or more antennas 810 and a base station device 820. The base station device 820 and each antenna 810 may be connected to each other via an RF cable.

Each of the antennas 810 includes a single or multiple antenna elements (such as multiple antenna elements included in a multiple input multiple output (MIMO) antenna), and is used for the base station device 820 to transmit and receive radio signals. The gNB 800 may include the multiple antennas 810, as illustrated in FIG. 21. For example, the multiple antennas 810 may be compatible with multiple frequency bands used by the gNB 800. The base station device 820 includes a controller 821, a memory 822, a network interface 823, and a wireless communication interface 825.

The controller 821 may be, for example, a CPU or a DSP, and operates various functions of higher layers of the base station device 820. For example, the controller 821 generates data packets from data in signals processed by the wireless communication interface 825, and transfers the generated packets via the network interface 823. The controller 821 may bundle data from multiple base band processors to generate bundled packet(s) and transfer the generated bundled packet(s). The controller 821 may have logic functions of performing control such as radio resource control, radio bearer control, mobility management, admission control, and scheduling. This control may be performed in conjunction with an gNB, eNB or a core network node in the vicinity (e.g., access and Mobility Management function). The memory 822 includes RAM and ROM, and stores program that is executed by the controller 821, and various types of control data (such as a terminal list, transmission power data, and scheduling data).

The network interface 823 is a communication interface for connecting the base station device 820 to the core network 824. The controller 821 can communicate with a core network node or another gNB/eNB via the network interface 823. In this case, the gNB 800, and the core network node or other gNBs/eNBs may be connected to each other through a logical interface (such as N2 interface, AMF and Xn interface, and gNB). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme (such as LTE, LTE-Advanced, NR (New Radio)), and provides wireless connection to terminal(s) positioned in a cell of the gNB 800 via the antenna 810. The wireless communication interface 825 may typically include, for example, a baseband (BB) processor 826 and an RF circuit 827. The BB processor 826 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)). The BB processor 826 may have a part or all of the above-described logic functions instead of the controller 821. The BB processor 826 may be a memory that stores a communication control program, or a module that includes a processor and related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 21. For example, the multiple BB processors 826 may be compatible with multiple frequency bands used by the gNB 800. The wireless communication interface 825 may include the multiple RF circuits 827, as illustrated in FIG. 21. For example, the multiple RF circuits 827 may be compatible with multiple antenna elements. Although FIG. 21 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 22:
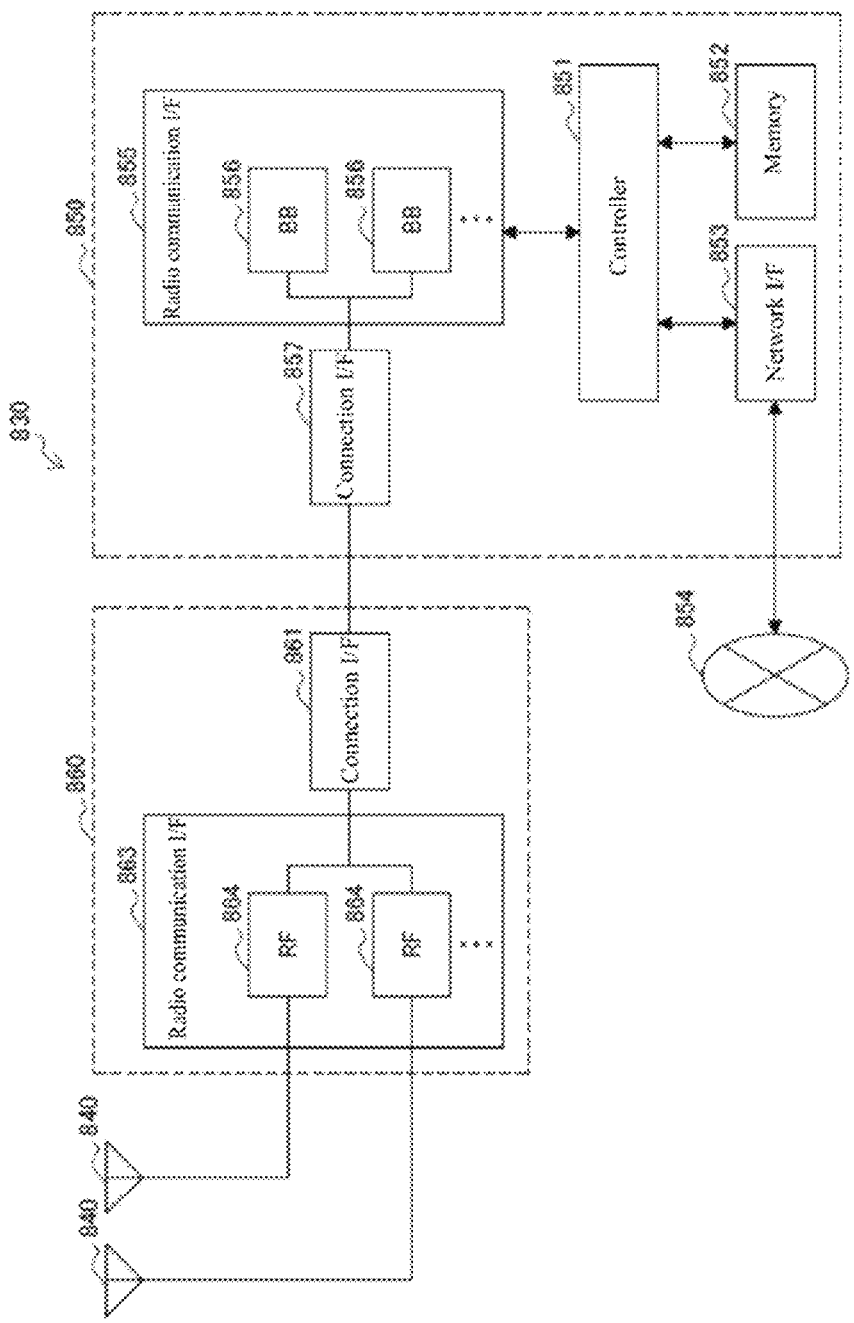
FIG. 22 is a block diagram illustrating a second example of a schematic configuration of gNB according to an embodiment of the present disclosure.

FIG. 22 is a block diagram illustrating a second example of a schematic configuration of an gNB to which the technology of the present disclosure may be applied. The gNB 830 includes one or more antennas 840, a base station device 850, and an RRH 860. The RRH 860 and each antenna 840 may be connected to each other via an RF cable. The base station device 850 and the RRH 860 may be connected to each other via a high speed line such as an optic fiber cable.

Each of the antennas 840 includes a single or multiple antenna elements (such as multiple antenna elements included in a MIMO antenna) and is used for the RRH 860 to transmit and receive radio signals. The gNB 830 may include the multiple antennas 840, as illustrated in FIG. 22. For example, the multiple antennas 840 may be compatible with multiple frequency bands used by the gNB 830. The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 21.

The wireless communication interface 855 supports any cellular communication scheme (such as LTE and LTE-Advanced) and provides wireless communication to terminal(s) positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 21, except that the BB processor 856 is connected to the RF circuit 864 of the RRH 860 via the connection interface 857. The wireless communication interface 855 may include multiple BB processors 856, as illustrated in FIG. 22. For example, the multiple BB processors 856 may be compatible with multiple frequency bands used by the gNB 830. Although FIG. 22 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communicating in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 22. For example, the multiple RF circuits 864 may support multiple antenna elements. Although FIG. 22 illustrates the example in which the wireless communication interface 863 includes the multiple RF circuits 864, the wireless communication interface 863 may also include a single RF circuit 864.

In the gNB 800 and the gNB 830 illustrated in FIGS. 21 and 22, the one or more components included in the processing circuit 2010/11010 described with reference to FIGS. 2 and 11 may be realized in the wireless communication interface 912. Alternatively, at least a portion of these components may also be realized by the controller 821 and the controller 851.

[Application Examples Regarding Terminal Device]

First Application Example

Figure 23:
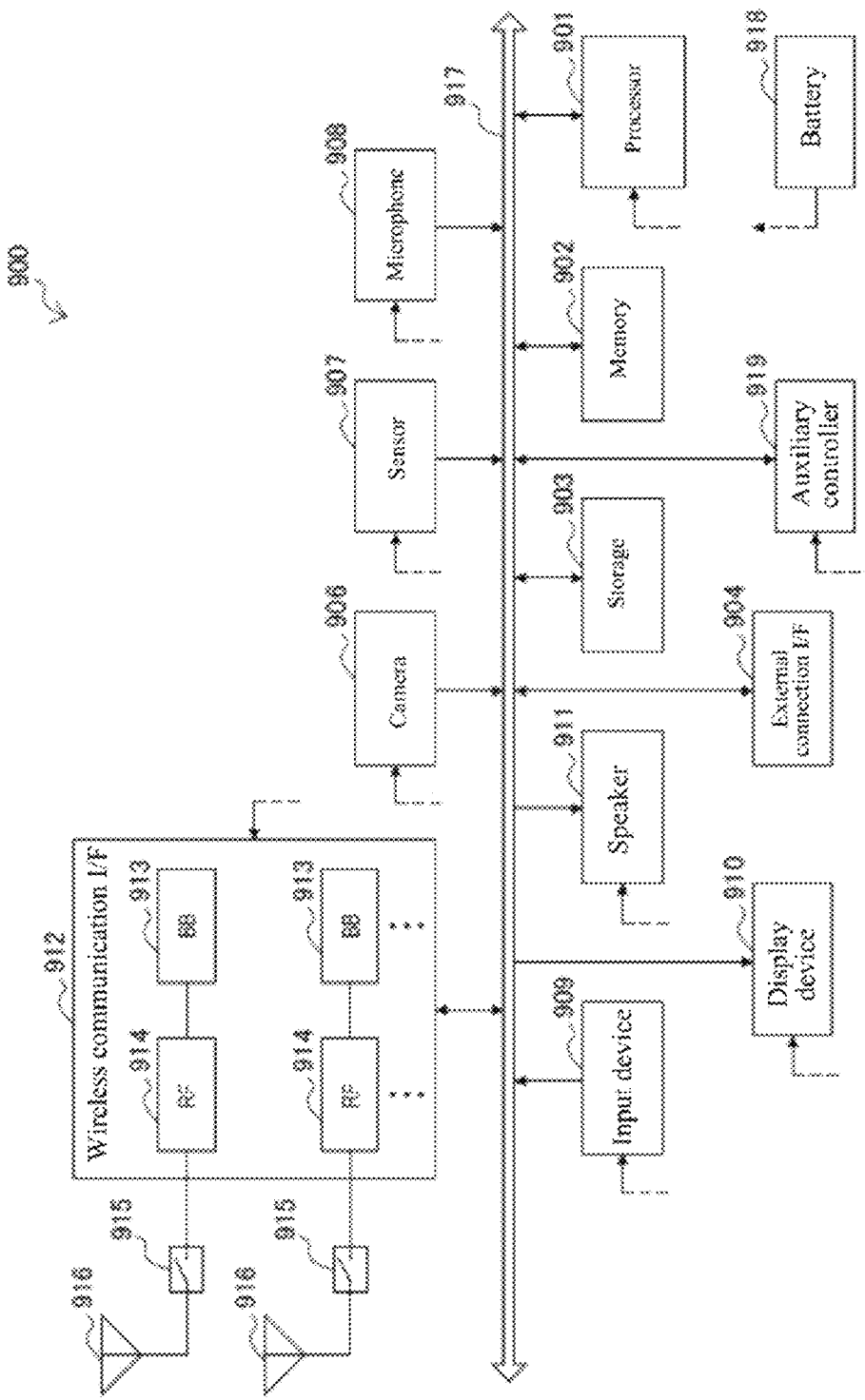
FIG. 23 is a block diagram illustrating an example of a schematic configuration of a smartphone according to an embodiment of the present disclosure.

FIG. 23 is a block diagram illustrating an example of a schematic configuration of a smartphone 900 to which the technology of the present disclosure may be applied. The smart phone 900 includes a processor 901, a memory 902, a storage 903, an external connection interface 904, an camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates captured image(s). The sensor 907 may include a group of sensors such as a measuring sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives operation(s) or information input from a user. The display device 910 includes a screen such as a liquid crystal display (LCD) and an organic light emitting diode (OLED) display, and displays an output image of the smartphone 900. The speaker 911 converts audio signals that are output from the smartphone 900 to sounds.

The wireless communication interface 912 supports any cellular communication scheme (such as LTE and LTE-Advanced) and performs wireless communication. The wireless communication interface 912 may typically include, for example, a BB processor 913 and an RF circuit 914. The BB processor 913 may perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may be one chip module that has the BB processor 913 and the RF circuit 914 integrated thereon. The wireless communication interface 912 may include the multiple BB processors 913 and the multiple RF circuits 914, as illustrated in FIG. 23. Although FIG. 23 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme, such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna) and is used for the wireless communication interface 912 to transmit and receive wireless signals. Smart phone 900 may include multiple antennas 916, as illustrated in FIG. 23. Although FIG. 23 illustrates the example in which the smartphone 900 includes the multiple antennas 916, the smartphone 900 may also include a single antenna 916.

Furthermore, the smart phone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smart phone 900 illustrated in FIG. 23 via feeder lines, which are partially shown as dashed lines in the figure. The auxiliary controller 919 operates a minimum necessary function of the smartphone 900, for example, in a sleep mode.

In the smartphone 900 illustrated in FIG. 23, the one or more components included in the processing circuit 2010/11010 described with reference to FIGS. 2 and 11 may be realized in the wireless communication interface 912. Alternatively, at least some of these components may also be realized by the processor 901 or the auxiliary controller 919.

Second Application Example

Figure 24:
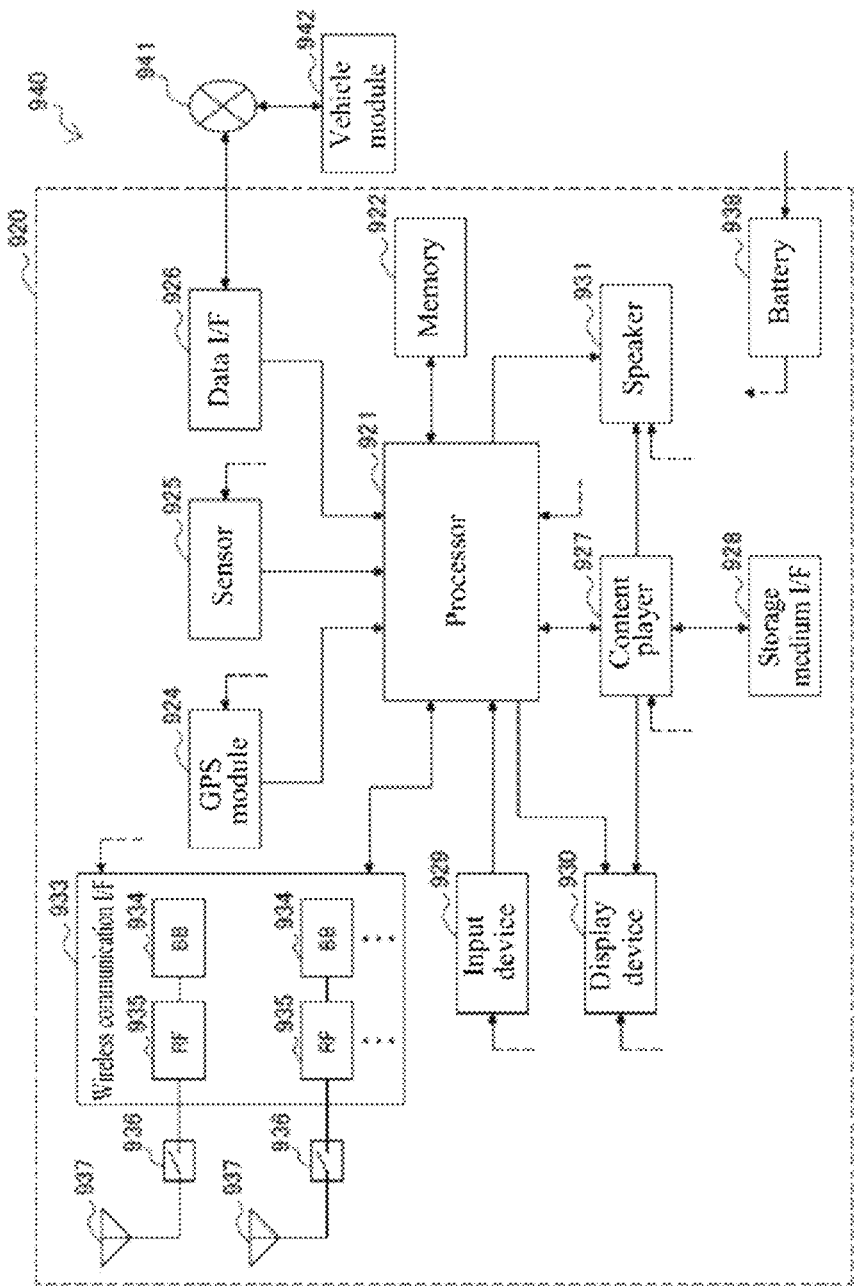
FIG. 24 is a block diagram showing an example of a schematic configuration of a car navigation device according to an embodiment of the present disclosure.

FIG. 24 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, and a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores data and program that is executed by the processor 921.

The GPS module 924 uses GPS signals received from a GPS satellite to measure a position (such as latitude, longitude, and altitude) of the car navigation device 920. The sensor 925 may include a group of sensor, such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives operation(s) or information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme (such as LTE and LTE-Advanced) and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may also be one chip module having the BB processor 934 and the RF circuit 935 integrated thereon. The wireless communication interface 933 may include the multiple BB processors 934 and the multiple RF circuits 935, as illustrated in FIG. 24. Although FIG. 24 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme, such as a short-distance wireless communication scheme, a near-field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna) and is used for the wireless communication interface 933 to transmit and receive wireless signals. The car navigation device 920 may include the multiple antennas 937, as illustrated in FIG. 24. Although FIG. 24 illustrates the example in which the car navigation device 920 includes the multiple antennas 937, the car navigation device 920 may also include a single antenna 937.

Furthermore, the car navigation device 920 may include the antenna 937 for each wireless communication scheme.

In that case, the antenna switches 936 may be omitted from the configuration of the car navigation device 920.

The battery 938 supplies power to blocks of the car navigation device 920 illustrated in FIG. 24 via feeders lines that are partially shown as dashed lines in the figure. The battery 938 accumulates power supplied from the vehicle.

In the car navigation device 920 illustrated in FIG. 24, the one or more components included in the processing circuit 2010/11010 described with reference to FIGS. 2 and 11 may be realized in the wireless communication interface 912. Alternatively, at least some of these components may also be realized by processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and failure information, and outputs the generated data to the in-vehicle network 941.

It is to be understood that the phrase "embodiment" or a similar expression in this specification means that a particular feature, structure, or characteristic described in connection with the embodiment is included in at least one specific embodiment of the present disclosure. Therefore, in the specification, the appearance of the terms "in an embodiment of the present disclosure" and the like is not necessarily referring to the same embodiment.

Those skilled in the art will appreciate that the present disclosure is embodied as a system, an apparatus, a method, or a computer readable medium as a computer program product (e.g., an instantaneous storage medium). Accordingly, the present disclosure may be embodied in various forms, such as a complete hardware embodiment, a complete software embodiment (including firmware, resident software, microcode, etc.), or as an implementation of software and hardware, which will be referred to as "circuit", "module" or "system" below. Furthermore, the present disclosure may also be embodied in any tangible media form as a computer program product having computer usable program code stored thereon.

The related description of the present disclosure is described with reference to flowchart illustrations and/or block diagrams of systems, apparatuses, methods, and computer program products according to specific embodiments of the present disclosure. It will be understood that each block of each flowchart and/or block diagram, and any combination of blocks in the flowcharts and/or block diagrams may be embodied using computer program instructions. These computer program instructions may be executed by a machine composed of a general purpose computer or a processor of a special computer or other programmable data processing apparatus, and the instructions are processed by a computer or other programmable data processing apparatus for implementation of the functions or operations described in the flowchart(s) and/or block diagram(s).

The flowcharts and block diagrams of the architecture, functions, and operations that may be embodied by the systems, apparatus, methods, and computer program products according to various embodiments of the present disclosure are shown in the drawings. Thus, each block in the flowcharts or block diagrams may represent a module, a segment, or a portion of program code that comprises one or more executable instructions to implement the specified logical function. Additionally, it should be noted that in some other embodiments, the functions described in the blocks may not be performed in the order as illustrated. By way of example, two blocks illustrated as connected may in fact be executed simultaneously, or in some cases, may also be executed in the reverse order as illustrated, depending on the function involved. In addition, it should be noted that blocks of each block diagram and/or flowchart, and combinations of blocks in the block diagrams and/or flowcharts may be embodied by means of a system based on dedicated hardware(s), or specific functions or operations may be performed by means of a combination of dedicated hardware(s) and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An electronic device for a first communication device side including:
   processing circuitry configured to:
   determine, based on priori information, a transmitting order for a plurality of transmitting beams of the first communication device in beam sweeping to be performed on a communication from the first communication device to a second communication device;
   control to use the plurality of transmitting beams in the beam sweeping according to the determined transmitting order, and
   obtain feedback information from the second communication device, the feedback information indicating a first transmitting beam in the plurality of transmitting beams of the first communication device, wherein a reception quality of the second communication device for a reference signal transmitted by the first transmitting beam is higher than a predetermined threshold; and
   control to use the first transmitting beam in the data transmission of the communication,
   wherein the beam sweeping is stopped when the feedback information is obtained from the second communication device,
   wherein the feedback information includes at least one of: information indicating an index of the first transmitting beam, information indicating the transmitting order of the first transmitting beam, information indicating an antenna port corresponding to the first transmitting beam, and a Channel State Information Reference Signal (CSI-RS) resource indicator indicating the first transmitting beam,
   wherein, when the first transmitting beam cannot be normally used, a second transmitting beam in the plurality of transmitting beams, whose transmitting order is higher than that of the first transmission beam, is used as a backup transmitting beam in beam switching, and
   wherein a reception quality for the second transmitting beam is the second best among those for the plurality of transmitting beams and is below that for the first transmitting beam.

2. The electronic device according to claim 1, wherein the priori information includes pre-recorded number of times that the plurality of transmitting beams were respectively used in data transmission.

3. The electronic device according to claim 2, wherein the priori information includes the pre-recorded number of times that the plurality of transmitting beams were respectively used in the data transmission from the first communication device to the second communication device.

4. The electronic device according to claim 2, wherein determining, based on the priori information, the transmitting order for the plurality of transmitting beams includes: arranging a transmitting order of a transmitting beam of the plurality of transmitting beams to be earlier if the transmitting beam of the plurality of transmitting beams was used more times.

5. The electronic device according to claim 1, wherein the priori information includes geographic position information of the second communication device.

6. The electronic device according to claim 5, wherein determining, based on the priori information, the transmitting order for the plurality of transmitting beams includes: arranging a transmitting order of a transmitting beam of the plurality of transmitting beams to be earlier if a pointing direction of the transmitting beam of the plurality of transmitting beams is closer to a geographic position indicated by the geographic position information.

7. The electronic device according to claim 5, wherein the priori information further includes pre-recorded number of times that the plurality of transmitting beams were respectively used in the data transmission,
determining, based on the priori information, the transmitting order for the plurality of transmitting beams includes: for one or more transmitting beams of the plurality of transmitting beams whose pointing geographical position deviates from a geographic position indicated by the geographic position information by less than a predetermined threshold, arranging the transmitting order of a transmitting beam of the plurality of transmitting beams to be earlier if the transmitting beam of the plurality of transmitting beams was used more times.

8. The electronic device according to claim 1, wherein the plurality of transmitting beams are used in the beam sweeping according to the determined transmitting order in a synchronization phase and/or data transmission phase of the communication.

9. The electronic device according to claim 1, wherein in a frame for the communication, time slots for the beam sweeping are determined according to the number of the transmitting beams used in the beam sweeping.

10. The electronic device according to claim 1, wherein the first communication device is a terminal device and the second communication device is a base station; or the first communication device is a base station and the second communication device is a terminal device,
wherein determining, based on the priori information, the transmitting order for the plurality of transmitting beams includes:
in a synchronization phase of the communication, determining a transmitting order for a plurality of rough transmitting beams of the base station in the beam sweeping based on the priori information for a cell controlled by the base station; and
in a data transmission phase of the communication, determining a transmitting order for a plurality of fine transmitting beams of the base station in the beam sweeping based on the priori information for the terminal device, wherein a coverage of the plurality of fine transmitting beams is within a coverage of one of the plurality of rough transmitting beams.

11. An electronic device for a second communication device side including:
processing circuitry configured to:
measure a reference signal transmitted by a first communication device, the first communication device transmitting a plurality of transmitting beams in beam sweeping to be performed on a communication from the first communication device to the second communication device; and
in the case that a reception quality for the measured reference signal is above a predetermined threshold for the first time, feedback, to the first communication device, feedback information indicating a first transmitting beam in the plurality of transmitting beams of the first communication device corresponding to the reference signal for which the reception quality is above the predetermined threshold,
wherein the beam sweeping is stopped at the first communication device when the feedback information is obtained from the second communication device,
wherein the feedback information includes at least one of: information indicating an index of the first transmitting beam, information indicating the transmitting order of the first transmitting beam, information indicating an antenna port corresponding to the first transmitting beam, and a Channel State Information Reference Signal (CSI-RS) resource indicator indicating the first transmitting beam,
wherein, when the first transmitting beam cannot be normally used, a second transmitting beam in the plurality of transmitting beams, whose transmitting order is higher than that of the first transmission beam, is used as a backup transmitting beam in beam switching, and
wherein a reception quality for the second transmitting beam is the second best among those for the plurality of transmitting beams and is below that for the first transmitting beam.

12. The electronic device according to claim 11, wherein the feedback is performed without waiting for other transmitting beams in the plurality of transmitting beams after receiving the first transmitting beam of the first communication device corresponding to the reference signal for which the reception quality is above the predetermined threshold.

13. The electronic device according to claim 11, wherein information indicating the other transmitting beams after receiving the first transmitting beam of the first communication device corresponding to the reference signal for which the reception quality is above the predetermined threshold is not fed back.

14. The electronic device according to claim 11, wherein the processing circuitry is further configured to:
determine, based on priori information, a receiving order for a plurality of receiving beams of the second communication device including the first transmitting beam corresponding to the reference signal transmitted by the first communication device; and
control to receive the plurality of receiving beams to receive the reference signal according to the determined receiving order.

15. A communication method including:
- determining, by a first communication device, based on priori information, a transmitting order for a plurality of transmitting beams of the first communication device in beam sweeping to be performed on a communication from the first communication device to a second communication device;
- controlling, by the first communication device, to use the plurality of transmitting beams in the beam sweeping according to the determined transmitting order,
- obtaining feedback information from the second communication device, the feedback information indicating a first transmitting beam in the plurality of transmitting beams of the first communication device, wherein a reception quality of the second communication device for a reference signal transmitted by the first transmitting beam is higher than a predetermined threshold;
- control to use the first transmitting beam in the data transmission of the communication,
- wherein the beam sweeping is stopped when the feedback information is obtained from the second communication device,
- wherein the feedback information includes at least one of: information indicating an index of the first transmitting beam, information indicating the transmitting order of the first transmitting beam, information indicating an antenna port corresponding to the first transmitting beam, and a Channel State Information Reference Signal (CSI-RS) resource indicator indicating the first transmitting beam,
- wherein, when the first transmitting beam cannot be normally used, a second transmitting beam in the plurality of transmitting beams, whose transmitting order is higher than that of the first transmission beam, is used as a backup transmitting beam in beam switching, and
- wherein a reception quality for the second transmitting beam is the second best among those for the plurality of transmitting beams and is below that for the first transmitting beam.

16. The communication method of claim 15, wherein the priori information includes pre-recorded number of times that the plurality of transmitting beams were respectively used in data transmission.

17. The communication method of claim 15, wherein the priori information includes geographic position information of the second communication device.

* * * * *